United States Patent
Bookbinder et al.

(10) Patent No.: US 10,696,580 B2
(45) Date of Patent: Jun. 30, 2020

(54) OPTICAL FIBER WITH LOW FICTIVE TEMPERATURE

(71) Applicant: Corning Incorporated, Corning, NY (US)

(72) Inventors: Dana Craig Bookbinder, Corning, NY (US); Ming-Jun Li, Horseheads, NY (US); Bruce Warren Reding, Corning, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/189,096

(22) Filed: Nov. 13, 2018

(65) Prior Publication Data

US 2019/0092678 A1 Mar. 28, 2019

Related U.S. Application Data

(62) Division of application No. 15/248,060, filed on Aug. 26, 2016, now Pat. No. 10,221,089.

(60) Provisional application No. 62/216,568, filed on Sep. 10, 2015.

(51) Int. Cl.
*C03B 37/029* (2006.01)
*C03B 37/027* (2006.01)

(52) U.S. Cl.
CPC ...... *C03B 37/029* (2013.01); *C03B 37/02727* (2013.01); *C03B 2201/02* (2013.01); *C03B 2201/06* (2013.01); *C03B 2205/55* (2013.01); *C03B 2205/56* (2013.01)

(58) Field of Classification Search
CPC ............ C03B 37/0235; C03B 37/0253; C03B 37/029
See application file for complete search history.

(56) References Cited

U.S. PATENT DOCUMENTS

| 4,396,409 A | 8/1983 | Bailey |
| 5,235,662 A | 8/1993 | Prince et al. |
| 6,565,775 B2 | 5/2003 | Dubois |

(Continued)

FOREIGN PATENT DOCUMENTS

| EP | 1205449 | 5/2002 |
| JP | 62003037 A | 1/1987 |

(Continued)

OTHER PUBLICATIONS

International Search Report and Written Opinion PCT/US2016/050644 dated Jan. 13, 2017.

(Continued)

*Primary Examiner* — Lisa L Herring
(74) *Attorney, Agent, or Firm* — Kevin L. Bray

(57) ABSTRACT

An optical fiber with low fictive temperature along with a system and method for making the optical fiber are provided. The system includes a reheating stage that heats the fiber along the process pathway to a temperature sufficient to lower the fictive temperature of the fiber by relaxing the glass structure and/or driving the glass toward a more nearly equilibrium state. The fiber is drawn from a preform, conveyed along a process pathway, cooled and subsequently reheated to increase the time of exposure of the fiber to temperatures conducive to lowering the fictive temperature of the fiber. The process pathway may include multiple reheating stages as well as one or more fiber-turning devices.

18 Claims, 14 Drawing Sheets

(56) References Cited

U.S. PATENT DOCUMENTS

| | | |
|---|---|---|
| 6,576,164 B2 | 6/2003 | Guenot |
| 6,851,282 B2 | 2/2005 | Nagayama |
| 6,928,840 B1 | 8/2005 | Nagayama |
| 6,954,572 B2 | 10/2005 | Moridaira |
| 7,164,831 B2 | 1/2007 | Kurusu |
| 7,565,820 B2 | 7/2009 | Foster |
| 7,677,060 B2 | 3/2010 | Oku et al. |
| 7,937,971 B2 | 5/2011 | Costello, III et al. |
| 8,020,411 B2 | 9/2011 | Moridaira |
| 8,074,474 B2 | 12/2011 | Filippov |
| 9,309,143 B2 | 4/2016 | Dunwoody |
| 2003/0086670 A1 | 5/2003 | Moridaira |
| 2003/0101774 A1 | 6/2003 | Oh et al. |
| 2005/0259932 A1 | 11/2005 | Nagayama et al. |
| 2007/0022786 A1 | 2/2007 | Foster et al. |
| 2009/0139269 A1 | 6/2009 | Filippov et al. |
| 2011/0239709 A1 | 10/2011 | Okada |
| 2011/0274404 A1 | 11/2011 | Okada |
| 2012/0014654 A1 | 1/2012 | Haruna |
| 2013/0255323 A1 | 10/2013 | Matsushita |
| 2014/0096565 A1 | 4/2014 | Gregorski et al. |
| 2015/0040614 A1 | 2/2015 | Dunwoody |
| 2015/0251945 A1 | 9/2015 | Nakanishi et al. |
| 2016/0168008 A1 | 6/2016 | Bookbinder et al. |

FOREIGN PATENT DOCUMENTS

| | | |
|---|---|---|
| JP | 10025127 A | 1/1998 |
| JP | 2003335545 A | 11/2003 |
| JP | 2004043231 A | 2/2004 |
| JP | 2004256367 A | 9/2004 |
| JP | 2005281090 A | 10/2005 |

OTHER PUBLICATIONS

EP16766453.1 Office Action dated Jun. 4, 2019, European Patent Office, 6 Pgs.

though such cooling rates are suitable for reducing the fictive temperature of an optical fiber. The short residence time arises because the fiber is cooled in a straight-line pathway from the draw furnace to the fiber winding stage.

OPTICAL FIBER WITH LOW FICTIVE TEMPERATURE

This application is a divisional of U.S. application Ser. No. 15/248,060 filed on Aug. 26, 2016, which claims the benefit of priority under 35 U.S.C. § 119 of U.S. Provisional Application Ser. No. 62/216,568 filed on Sep. 10, 2015 the content of which is relied upon and incorporated herein by reference in its entirety.

FIELD

This description pertains to optical fibers with low fictive temperature. This description also pertains to methods and systems for making optical fibers with low attenuation.

BACKGROUND

In the manufacturing of the optical fibers, the optical preforms are heated to temperatures much above the glass softening point and then drawn at large draw down ratios to form optical fibers 125 μm in diameter. Due to the high draw temperatures, large draw down ratios and fast draw speeds, the glass is far from the equilibrium state, resulting in fibers with high fictive temperature. High fictive temperature is undesirable for fibers used for transmission of optical signals because high fictive temperature is known to correlate with increased signal attenuation. To reduce signal attenuation in transmission fibers, it is desirable to modify fiber processing conditions to produce fibers with lower fictive temperature. Efforts to reduce fictive temperature have emphasized slow cooling of the fiber to stabilize the fiber in a state closer to the equilibrium state. Prolonged cooling of the fiber in a critical temperature regime in the glass transition region of the fiber is one strategy for reducing fiber fictive temperature. The extent to which fiber fictive temperature can be reduced in existing fiber processing systems, however, is limited because the residence time of the fiber at temperature within the critical regime are too short (<0.2 sec) to permit significant relaxation of the structure of the glass. Because of the short residence time, the structure of the glass remains far from the equilibrium state and only a modest decrease in fictive temperature is achieved. It would be desirable to develop methods of fiber processing that enable the production of fibers having low fictive temperature.

SUMMARY

The present description provides an optical fiber having a low fictive temperature. The optical fiber is a glass fiber and is processed under conditions that promote more complete structural relaxation of the glass. The more complete structural relaxation leads to a lower fictive temperature for the fiber and reduces the attenuation of the fiber.

Fiber processing conditions include drawing a fiber from a preform, cooling the fiber, and reheating the fiber. The conditions may include multiple cycles of cooling and reheating. The reheating includes heating the fiber to a temperature sufficient to allow the structure of the glass to relax in the glass transition region. As the structure of the glass relaxes, the fictive temperature of the fiber is reduced and the resulting fiber exhibits reduced attenuation of optical signals.

The present description extends to:
A system for processing an optical fiber comprising:
 a draw furnace, said draw furnace containing an optical fiber preform;
 an optical fiber drawn from said optical fiber preform, said optical fiber extending from said draw furnace along a process pathway;
 a first reheating stage operatively coupled to said draw furnace along said process pathway, said optical fiber entering said first reheating stage at a first temperature and exiting said first reheating stage at a second temperature, said second temperature being higher than said first temperature.

The present description extends to:
A system for processing an optical fiber comprising:
 a draw furnace, said draw furnace containing an optical fiber preform;
 an optical fiber drawn from said optical fiber preform, said optical fiber extending from said draw furnace along a process pathway;
 a first reheating stage operatively coupled to said draw furnace along said process pathway, said optical fiber entering said first reheating stage at a first temperature and exiting said first reheating stage at a second temperature, said second temperature being higher than said first temperature; and
 a first slow cooling device operatively coupled to said first reheating stage, said optical fiber entering said first slow cooling device at a third temperature and exiting said slow cooling device at a fourth temperature, said fourth temperature being less than said third temperature.

The present description extends to:
A method of processing an optical fiber comprising:
 drawing an optical fiber from a preform, said optical fiber having a first temperature;
 conveying said optical fiber along a process pathway;
 cooling said optical fiber from said a first temperature to a second temperature along said process pathway; and
 heating said optical fiber from said second temperature to a third temperature along said process pathway.

The present description extends to:
A method for processing an optical fiber comprising:
 forming an optical fiber, said optical fiber comprising silica or doped silica;
 cooling said optical fiber; and
 heating said cooled optical fiber;
 wherein the time period over which said fiber is exposed to a temperature in the range from 1000° C. to 1700° C. for longer than 0.2 sec.

The present disclosure extends to:
A method of processing an optical fiber comprising:
 providing a fiber along a first pathway;
 cooling said fiber in a first treatment region along said first pathway, said fiber entering said first treatment region at a first average temperature and exiting said first treatment region at a second average temperature, said second average temperature being in the range from 900° C. to 1400° C., said cooling from said first average temperature to said second average temperature occurring at a first cooling rate;
 cooling said fiber in a second treatment region along said first pathway, said fiber entering said second treatment region at a third average temperature and exiting said second treatment region at a fourth average temperature, said fourth average temperature being in the range from 800° C. to 1200° C., said cooling from said third average temperature to said fourth average temperature occurring at a second cooling rate; and
 redirecting said fiber from said first pathway to a second pathway, said second pathway being non-collinear with said first pathway, heating said fiber in a third treatment region along said second pathway, said fiber entering a third treatment region at a fifth average temperature and exiting third treatment region at a sixth average temperature, said fifth average temperature being in the range from 23° C. and 500° C. and said sixth average temperature being in the range from 600° C. and 1500° C.; and cooling said fiber in a fourth treatment region along said second pathway, said fiber entering fourth treatment region at a seventh average temperature and exiting said fourth treatment region at an eighth average temperature, said seventh average temperature being in the range from 600° C. and 1500° C. and said eighth average temperature being in the range from 1000° C. and 1500° C.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings are illustrative of selected aspects of the present description, and together with the specification serve to explain principles and operation of methods, products, and compositions embraced by the present description. Features shown in the drawing are illustrative of selected embodiments of the present description and are not necessarily depicted in proper scale.

BRIEF DESCRIPTION OF THE DRAWINGS

While the specification concludes with claims particularly pointing out and distinctly claiming the subject matter of the written description, it is believed that the specification will be better understood from the following written description when taken in conjunction with the accompanying drawings, wherein:

The embodiments set forth in the drawings are illustrative in nature and not intended to be limiting of the scope of the detailed description or claims. Whenever possible, the same reference numeral will be used throughout the drawings to refer to the same or like feature.

DETAILED DESCRIPTION

Figure 1:
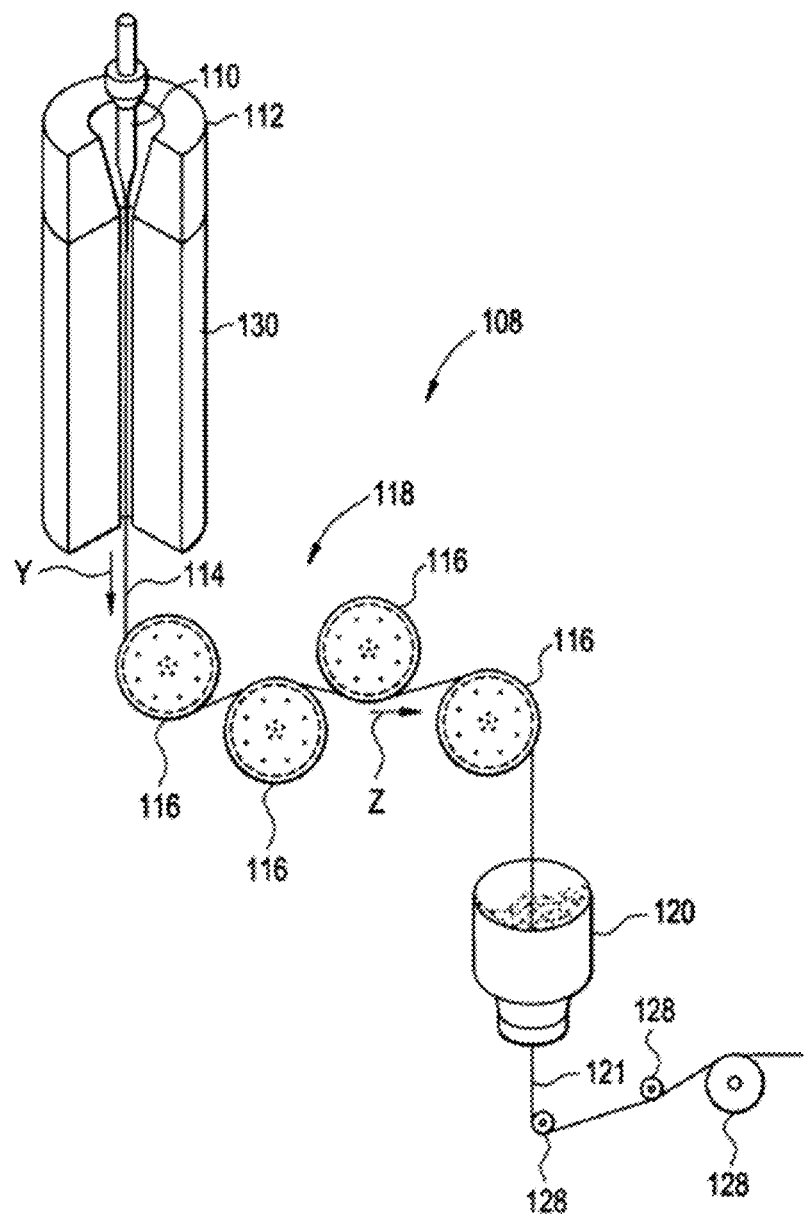
FIG. 1 depicts a system and method for manufacturing an optical fiber.

Reference will now be made in detail to illustrative embodiments of the present description. For purposes of the present description, the illustrative embodiments relate to silica-based optical fibers. Silica-based optical fibers include fibers made from pure silica, doped silica, or a combination of pure and doped silica. Processing conditions (e.g. temperatures, cooling ranges, cooling rates, draw speeds, etc.) and properties (e.g. fictive temperature, viscosity, attenuation, refractive index, etc.) are stated in reference to silica-based optical fibers. As those of skill in the art recognize, however, the principles of the present disclosure extend to optical fibers based on other material systems with due consideration for characteristics of the constituents of other material systems (e.g. melting temperature, viscosity, fictive temperature, time scale for structural relaxation etc.).

The present description provides an optical fiber having a low fictive temperature. The optical fiber is a glass fiber and is processed under conditions that promote more structural relaxation of the fiber and reduction in attenuation in the optical fiber. The increased structural relaxation and/or closer approach of the fiber to an equilibrium state leads to a lower fictive temperature for the fiber and reduces the attenuation of the fiber.

In conventional fiber processing, a fiber is formed by heating a glass preform above the softening point and drawing the fiber at large draw down ratios to form optical fibers with a desired diameter. For silica glass fibers, the preform diameter can be on the order of ~100-120 mm or larger and glass fibers drawn from the preform typically have a diameter of 125 µm. To manufacture silica glass fibers, the silica glass preform is heated to a temperature above 2000° C. and fiber is drawn at speeds of 10 m/s or higher. Due to the high draw temperatures, large draw down ratios and fast draw speeds, the glass structure of silica-based fibers is far from equilibrium and has a fictive temperature higher than 1500° C. Without wishing to be bound by theory, it is believed that the non-equilibrium structure of silica glass fibers is a significant underlying cause of signal attenuation in silica glass fibers. It is accordingly believed that lower attenuation can be achieved in optical fibers by modifying processing conditions to stabilize glass structures and reducing fictive temperature of the glass optical fiber.

For purposes of the present description, fictive temperature will be used as an indicator of glass structure. Glasses with high fictive temperature have structures that are further removed from equilibrium than glasses with low fictive temperature. Processing conditions that lower the fictive temperature of the glass produce optical fibers with lower attenuation.

In accordance with the present description, processing conditions that extend the period of time in which the fiber is exposed to temperatures in the glass transition region or the near-glass transition region during cooling are shown to facilitate relaxation of the structure of the fiber and to reduce the fictive temperature of the fiber. As used herein, glass transition region is a temperature range that includes the glass transition temperature ($T_g$). In one embodiment, the glass transition region extends from below the glass transition temperature to above the glass transition temperature. The glass transition region generally ranges between 1200° C. and 1700° C. for silica glass optical fibers. There may be additional relaxation of the glass or inducement of the glass toward a more nearly equilibrium state below the glass transition region (near-$T_g$ region), which, for silica-based fibers, corresponds to temperatures between 1000° C. and 1200° C.

In one embodiment, the fiber after getting formed undergoes a reheating step and the process temperature window over which cooling facilitates relaxation of glass structure and/or inducement of the fiber closer to an equilibrium state to provide an optical fiber with reduced fictive temperature ranges from 1000° C. to 1475° C. The process temperature window may be in the range from 1000° C. to 1600° C., or in the range from 1000° C. to 1450° C., or in the range from 1000° C. to 1300° C., or in the range from 1000° C. to 1200° C.

When the fiber is cooled at process temperatures below the near-$T_g$ region (e.g. at temperatures below 1000° C.), the structure of the glass and/or state of the fiber is kinetically quenched and essentially invariant (on practical time scales) as the available thermal energy is less than the energy needed to relax or otherwise modify the glass to effect structural relaxation or a closer approach to an equilibrium state. As used herein, process temperature refers to the temperature to which the fiber is exposed during processing. The process temperature or process temperature window, for example, may correspond to a temperature or temperature window maintained in the slow cooling device described herein.

It is understood that the temperature of the fiber may differ from the process temperature. The process temperature(s) or process temperature window(s) described herein may insure that the temperature of the fiber is in the range from 1000° C. to 1700° C., or in the range from 1050° C. to 1700° C., or in the range from 1100° C. to 1700° C., or in the range from 1000° C. to 1500° C., or in the range from 1100° C. to 1500° C., or in the range from 1000° C. to 1400° C., or in the range from 1100° C. to 1400° C.

Optical fibers are generally drawn in air at ambient pressure. Cooling rates in air generally exceed 12000° C./sec during draw processes based on prior art methods, which means that the residence time of the fiber in the process temperature window that facilitates reduction of the fictive temperature of the fiber is short (less than 0.05 sec) and the fiber is quickly cooled to temperatures that kinetically quench the structure or state of the fiber. The fictive temperature of the fiber is accordingly high. In the case of silica glass fibers, for example, the fiber fictive temperature is typically 1550° C. or higher and such fibers have high attenuation.

In contrast to the prior art, the current invention describes methods and systems for drawing optical fibers in which the optical fibers are maintained at process temperatures between 1000° C. and 1700° C. for longer than 0.1 sec, or longer than 0.2 sec, or longer than 0.3 sec, or longer than 0.4 sec, or longer than 0.5 sec, or longer than 1.0 sec, or longer than 2.0 sec, or longer than 3.0 sec, or longer than 4.0 sec. In further embodiments, the optical fibers are maintained at process temperatures between 1000° C. and 1300° C. for longer than 0.1 sec, or longer than 0.2 sec, or longer than 0.3 sec, or longer than 0.4 sec, or longer than 0.5 sec, or longer than 1.0 sec, or longer than 2.0 sec, or longer than 3.0 sec, or longer than 4.0 sec.

The process temperatures may insure that the temperature of the optical fiber is maintained at a temperature between 1000° C. and 1700° C. for longer than 0.1 sec, or longer than 0.2 sec, or longer than 0.3 sec, or longer than 0.4 sec, or longer than 0.5 sec, or longer than 1.0 sec, or longer than 2.0 sec, or longer than 3.0 sec, or longer than 4.0 sec. In further embodiments, the process temperatures may insure that the temperature of the optical fiber is maintained at a temperature between 1100° C. and 1500° C. for longer than 0.1 sec, or longer than 0.2 sec, or longer than 0.3 sec, or longer than 0.4 sec, or longer than 0.5 sec, or longer than 1.0 sec, or longer than 2.0 sec, or longer than 3.0 sec, or longer than 4.0 sec. In further embodiments, the process temperatures may insure that the temperature of the optical fiber is maintained at a temperature between 1100° C. and 1700° C. for longer than 0.1 sec, or longer than 0.2 sec, or longer than 0.3 sec, or longer than 0.4 sec, or longer than 0.5 sec, or longer than 1.0 sec, or longer than 2.0 sec, or longer than 3.0 sec, or longer than 4.0 sec.

FIG. 1 depicts a typical system for producing optical fibers from the prior art. System 108 includes fiber preform 110 situated in furnace 112. Fiber preform 110 is constructed of a glass, such as silica glass, and may include regions of different composition. Preform 110, for example, may include regions of modified and unmodified silica glass with compositions corresponding to the core and cladding compositions desired for fibers drawn from the preform. Fiber preform 110 is heated in furnace 112 and a fiber 114 is drawn therefrom. Fiber 114 enters treatment zone 130 and begins to cool. Fiber 114 exits treatment zone 130 and is directed through a cooling region 118 that includes a series of fluid bearing devices 116. Fluid bearing devices 116 further cool the fiber and direct the fiber to coating unit 120, at which a coating is applied to provide coated fiber 121. After exiting coating unit 120, coated optical fiber 121 may go through a variety of other processing stages within the system that are known in the art (not shown). Drawing mechanisms 128 are used to provide tension on the optical fiber as it is drawn through system 108.

Fluid bearing devices are described in U.S. Pat. No. 7,937,971, the disclosure of which is incorporated by reference herein. A general description of the construction and operation of an illustrative fluid bearing device follows. It should be understood, however, that other designs are possible for the fluid bearing devices and that the benefits achievable by the methods and apparatus disclosed herein are not limited to a particular design for fluid bearing devices.

Figure 2:
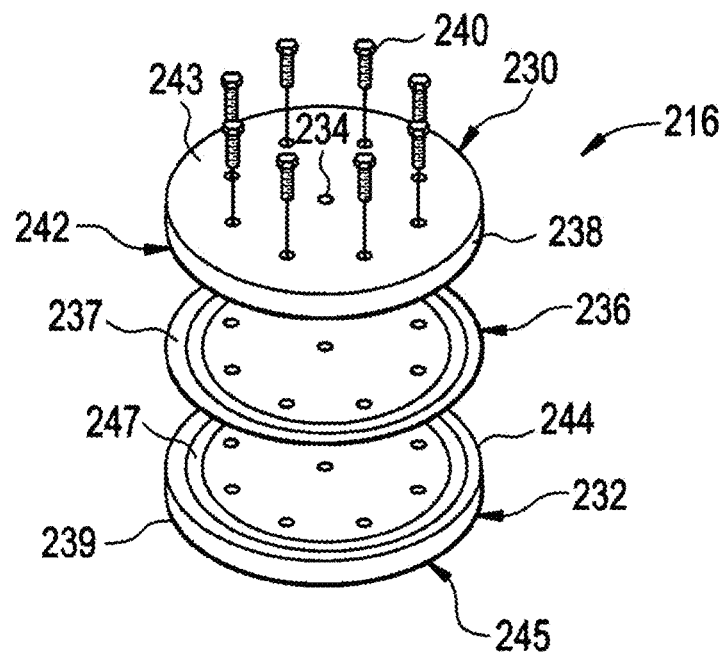
FIG. 2 depicts a fluid bearing device for use in an optical fiber production system.
Figure 3:
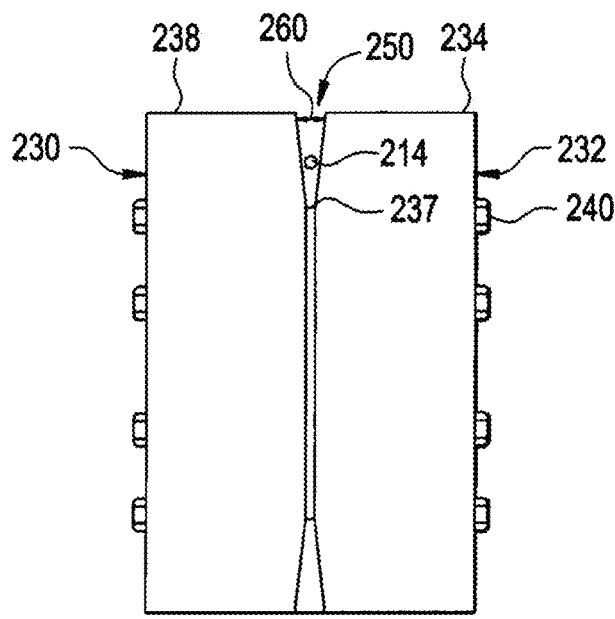
FIG. 3 depicts a fluid bearing device in side view.

A typical design for a fluid bearing device is shown in FIGS. 2 and 3. Fluid bearing device 216 in FIG. 2 includes a first plate 230, a second plate 232, an inner member 236 and at least one opening 234 in at least one of the first and second plates. The first plate 230 and the second plate 232 can be made of metal and include arcuate outer surfaces 238 and 239, respectively. The first plate 230 and the second plate 232 are connected by fasteners (e.g., bolts 240) to link the plates 230, 232 together so that fluid may be passed through the bearing assembly 216. The arcuate outer surfaces 238, 239 of each plate 230, 232 generally lie along the circumference of each of the respective plates 230, 232. The first plate 230 and the second plate 232 each have respective inner 242, 244 and outer faces 243, 245, wherein the inner faces 242, 244 of the plates 230, 232 are aligned with each other. A recessed portion 247 extends at least partially around the inner faces 242, 244 of either the first plate 230 or the second plate 232 to provide a plenum for fluid flow. In another embodiment, the recessed portion may comprise a variety of configurations to provide uniform flow into fiber support channel 250, as discussed later herein.

In the embodiment illustrated in FIG. 2, the arcuate outer surfaces 238, 239 of the first plate 230 and the second plate 232 are preferably substantially aligned and form a region between the outer surfaces 238, 239 of both the first plate 230 and the second plate 232. This region is configured to receive an optical fiber so that optical fiber can travel along this region without rotation of the bearing assembly. This fiber support channel 250 is more clearly illustrated in the embodiment shown in FIG. 3 (discussed later herein). At least one opening 234 passes through at least one of the first plate 230 and the second plate 232. As shown in FIG. 2, the opening 234 of the first plate 230 and the second plate 232 allow for a fluid (e.g., air, helium or other desired gas or liquid) to be fed through the fluid bearing device 216 from opening 234 to the fiber support channel 250 that is formed between the first plate 230 and the second plate 232. As described more fully hereinbelow, the fluid supplied to channel 250 creates a high pressure region between the fiber and the surface of channel 250. The fluid, in combination with the tension driving the draw, acts to stabilize the fiber in channel 250 and to position the fiber above the surface of channel 250 to prevent mechanical contact of the fiber with the fluid bearing device. The fluid passed through the fluid bearing device may be referred to herein as a levitating fluid. The levitating fluid may be a gas or liquid. Representative levitating fluids include air, $N_2$, and inert gases.

In addition, the fluid bearing device 216 may include an inner member 236 positioned between the first plate 230 and the second plate 232. The inner member 236 (e.g., a shim 237) is configured to aid in directing the levitating fluid to the region between the outer surfaces 238, 239 of the first plate 230 and the second plate 232 such that the levitating fluid exits the fiber support channel 250 having a predetermined flow direction. The inner member 236 rests between the first plate 230 and second plate 232 to provide a gap there between. If desired, inner member 236 can comprise a plurality of fingers (not shown) to further control fluid flow by suppressing non-radial flow. In addition, the inner member 236 serves as a sealing portion to provide substantial contact between the first plate 230 and the second plate 232. Inner member may also include notches to facilitate entry and exit of the optical fiber.

As shown in FIG. 3, the fiber support channel 250 formed between the outer surfaces 238, 239 of the first plate 230 and the second plate 232 can be tapered where the levitating fluid exits between the first plate 230 and the second plate 232. In another embodiment however, fiber support channel 250 may include a parallel or reverse tapered shape, for example. In addition, the opening 260 within the tapered fiber support channel 250 is variable depending on where the optical fiber 214 is positioned. Preferably, the opening 260 and the fiber support channel 250 are configured so that, for the particular draw tensions and draw speeds employed and flow rates of the levitating fluid through the opening 260, the optical fiber is maintained in a section of fiber support channel 250 which is less than 500 µm, more preferably less than 400 µm, even more preferably 300 µm, and most preferably less than 200 µm wide, for a fiber having a typical outer diameter of 125 µm. Thus, the fiber is preferably retained within a region of the channel 250 which is between 1 and 2 times the diameter of the fiber, more preferably between 1 and 1.75 times the diameter of the fiber, and most preferably between 1 and 1.5 times the diameter of the fiber. Preferably, the fiber is located within a region of said channel such that the distance between the outer fiber and each wall is between 0.05 and 0.5 times the fiber diameter.

In the embodiment illustrated in FIG. 3, for ease of viewing, the tapered angle has been exaggerated in the illustration from what is a preferred angle of taper opening to fiber support channel 250. In reality, at least one of and preferably both of the opposing surfaces of support channel 250 are each inclined, preferably at an angle greater than 0° and less than 10°, more preferably between 0.3° and 7°, and most preferably between 0.4° and 3°, so that the width 260 of the top or outer portion of fiber support channel 250 is wider than the width 260 of the bottom or inner portion 237 of fiber support channel 250. For example, in such an embodiment, the first plate 230 and the second plate 232 forming the region may be inclined at an angle of −0.6° and +0.6°, respectively. Alternatively, fiber support channel 250 may comprise any depth, width or tapered angle. By utilizing a tapered fiber support channel 250 and injecting the fluid into the slot formed by fiber support channel 250 so that the fluid enters the narrower inner portion of fiber support channel 250 and exits the wider outer region of fiber support channel 250, the cushion of levitating fluid emitted through channel 250 will cause the fiber to be self-locating within the depth of the channel 250. For example, for a given rate of flow of the levitating fluid, if the fiber draw tension is increased, the fiber will move downward in the channel 250 until the gaps between the fiber 214 and channel walls are small enough that the pressure in region 237 is high enough to correctly counteract the new higher tension. If the fiber draw tension is decreased, the fiber will move upwardly within the channel 250 until the gaps between fiber 214 and channel walls are large enough that the pressure in region 237 is small enough to counteract the new, lower tension. Tapering the channel 250 thus enables the channel 250 to work with a wider range of draw tensions. Otherwise, if channel 250 as shown was not tapered and the draw tension was decreased, the fiber may travel upward and out of fiber support channel 250.

Preferably, the fiber is located in an area of the channel 250 that is between about 1 and 2 times the fiber diameter, more preferably between about 1 and 1.75 times the fiber diameter, most preferably between about 1 and 1.5 times the fiber diameter. By locating the fiber in such a relatively narrow region in channel 250, the fiber will center itself during operation due to the Bernoulli effect. For example, as the fiber gets closer to either opposing surface of channel 250, the velocity of the levitating fluid will increase nearest one surface and decrease nearest the other. According to the Bernoulli effect, an increase in levitating fluid velocity occurs simultaneously with a decrease in pressure. As a result, the greater pressure caused by the decreased levitating fluid flow near one surface will force the fiber back into the center of channel 250. Thus, in the preferred embodiments, the fiber is centered within the fiber support channel 250 at least substantially via the Bernoulli effect due to a stream of levitating fluid that is passing around the fiber and out of the fiber support channel 250 while the fiber is being drawn. Notably, such centering occurs without having to utilize any flow of levitating fluid that would impinge upon the fiber from the side thereof, e.g., there are no jets of levitating fluid emanating from sidewalls of channel 250.

The velocity of the stream of levitating fluid traveling through the slot is preferably adjusted to maintain the fiber so that the fiber is located entirely within a tapered region of the slot 250. In the embodiment of FIG. 3, because the fiber is located in an area of the channel 250 that is between about 1 and 2 times the fiber diameter, the fiber is supported by a pressure difference that exists below the fiber 214 (rather and as opposed to aerodynamic drag which might also be used to support a fiber, if one so chose). By supporting or levitating the fiber within channel 250 via a fluid pressure differential, much lower fluid flows can be employed than if aerodynamic drag was used to levitate the fiber.

In the embodiment illustrated in FIG. 3, the fluid stream is preferably provided by a single levitating fluid stream that enters fiber support channel 250 via the narrower inner portion of fiber support channel 250 and exits via the wider outer region 260 of fiber support channel 250. In this way, the fiber can be positioned entirely within the slot formed by fiber support channel 250 such that the fiber floats between the narrowest and widest portion of the slot. By employing a tapered fiber support channel 250 and injecting the levitating fluid through the region 250 in this manner, it is possible to retain a fiber in a region of said slot formed by fiber support channel 250 wherein the slot has a width that is between 10 µm to 150 µm, more preferably between 15 µm and 100 µm, and most preferably between about 24 µm 70 µm greater than the diameter of the fiber being directed through the fiber support channel 250. During the fiber draw process, the fiber is also preferably retained within a region of the channel such that the distance between the outer fiber and each wall is between 0.05 and 0.5 times the fiber diameter.

In some preferred embodiments, fiber support channel 250 is provided with a means for reducing pressure under the fiber as the fiber moves outwardly away from the source of the levitating fluid flow. Such a means for releasing pressure can be achieved in the form of a tapered channel design, as described above.

The fluid bearing devices enable the optical fiber to travel along the region of levitating fluid cushion so as to prevent or substantially prevent actual mechanical contact between the optical fiber and the bearing assembly, e.g., the fiber travels within fiber support channel 250 without contacting either of plates 230 or 232. In addition, because of the size and configuration of the region, the fluid bearing device is capable of maintaining the fiber within the region without mechanical contact through a range of draw tensions without active control of the levitating fluid flow.

The levitating fluid flow can be important to prevent the optical fiber 214 from moving towards the bottom of the fiber support channel 250 and coming in contact with the shim 237 or the sides of the fiber support channel 250. This is particularly important when the optical fiber is still uncoated so that the fiber quality is not compromised by the mechanical contact with the fluid bearing device or channel 250. Moreover, it is believed the closer the optical fiber 214 is positioned relative to the bottom of the fiber support channel 250, the higher the pressure needs to be within the fiber support channel 250 to maintain the optical fiber 214 at the desired location. As is evident, the taper in channel sides will cause the gaps between the channel sides and the fiber to be smaller, causing this necessary higher pressure.

Other factors influencing fiber position within fiber support channel 250 include the draw tension. For example, fiber pulled with 200 g of tension will float lower within fiber support channel 250 than fiber pulled with a tension of 100 g given the same fluid flow. As such, it is important that the flow of levitating fluid exiting the region of the fluid bearing be sufficient to maintain the optical fiber at the desired location for the particular fiber draw speed and draw tension employed.

For example, in an embodiment that utilizes a fiber support channel 250 having a width of about 127 µm at the innermost section between plates 230 and 232 and approximately 380 µm at the outermost section, the levitating fluid flow rate can be from about 0.5 L/sec to more than 5 L/sec. Such a configuration and flow of levitating fluid can result in local fluid velocities around the optical fiber of up to 800 km/hour or higher. Thus, in some embodiments the maximum levitating fluid velocities around the fiber employed in the fiber support channel 250 are higher than 100 km/hr, higher than 200 km/hr, higher than 400 km/hr, and possibly even higher than 600 km/hr. In some embodiments, maximum levitating fluid velocities around the fiber employed in the fiber support channel 250 may be higher than 900 km/hr. However, the methods disclosed herein are certainly not limited to these velocities, and in fact the velocity preferably can be chosen to result in the fiber being located at a desired location within fiber support channel 250, depending on draw conditions (e.g. draw speed, draw tension, etc.) and fluid bearing design. In another embodiment, the flow rate of levitating fluid can be from about 3 L/sec to about 4 L/sec. Of course, any rate of flow of levitating fluid sufficient to maintain the optical fiber at the desired location at a given draw tension can be utilized.

In some embodiments, the speed that the optical fiber is drawn at is greater than 10 m/s, in other embodiments, the speed is greater than 20 m/s, in other embodiments, the speed is greater than 30 m/s, in other embodiments, the speed is greater than 40 m/s, in other embodiments, the speed is greater than 50 m/s, and still in other embodiments, the speed is greater than 60 m/s, One of the drawbacks of system 108 shown in FIG. 1 is that the rate of cooling of the fiber is high when using the high draw speeds desired for manufacturing. Cooling rates of 12,000° C./sec or higher are encountered under conditions typically used to manufacture optical fibers, which means that the time at which the fiber is at a temperature sufficient to induce structural relaxation and/or closer approach of the state of the fiber to an equilibrium state is too short to permit a reduction in fictive temperature sufficient to meaningfully reduce the attenuation of the fiber.

A possible strategy for decreasing the cooling rate include increasing the temperature of treatment zone 130 to more closely match the temperature of the fiber as it enters treatment zone 130. A lower temperature difference between treatment zone 130 and furnace 112 would lower the cooling rate of the fiber. In principle, treatment zone 130 could include a temperature gradient that permits gradual cooling of the fiber from its entrance temperature (1500° C. or above) to lower temperatures in such a way that the residence time of the fiber in the 1000° C.-1700° C. range is sufficiently long to achieve the structural relaxation needed to lower fictive temperature as described herein. Alternatively, the fiber processing system might include multiple treatment zones operated at progressively decreasing temperatures to cool the fiber while prolonging the residence time of the fiber in the preferred 1000° C.-1700° C. process temperature window.

Although conceptually viable, strategies for controlled cooling of the fiber that involve adjustments of the conditions of treatment zone 130 are difficult to implement in practice. In order to control cooling of the fiber to best facilitate the structural relaxation needed to achieve low fictive temperature, it is necessary to maximize the time at which the temperature of the fiber is in the preferred 1000° C.-1700° C. process temperature window identified herein. When the prior art fiber processing system shown in FIG. 1 is operated at commercial draw speeds, the time at which the fiber temperature is in the 1200° C.-1700° C. process temperature window is limited to ~0.2 sec. This time is too short to permit significant structural relaxation of the glass and the fictive temperature of fiber produced from the system is accordingly high (~1500° C. or higher). In order to increase the residence time between 1000° C. and 1700° C., it is necessary to control the temperature of treatment zone 130 to reduce the rate of cooling. As noted hereinabove, proper control of the temperature requires a more gradual reduction in the temperature of the fiber to ensure an adequate residence time of the fiber in the 1000° C.-1700° C. process temperature window. As the reduction in temperature becomes more gradual, however, the length of treatment zone 130 increases. To establish the gradual controlled cooling necessary to reduce the fictive temperature of the fiber meaningfully below 1500° C. at commercial draw speeds, the required length of treatment zone 130 would exceed the vertical headspace (floor-to-ceiling) available in most production facilities. Modification of existing facilities to accommodate greater vertical headspace would increase the cost of production to an unreasonable degree. An alternative approach of reducing draw speed within existing limits of vertical headspace is also undesirable because it leads to higher costs through lower manufacturing throughput.

Incorporation of fluid bearing devices into the fiber processing system is advantageous because they enable redirection of the fiber during processing in a horizontal or other non-vertical direction. By incorporating fluid bearing devices into the system, the path length available for fiber processing can be increased without a need to increase vertical space in the facility. In system 108 shown in FIG. 1, fluid bearing devices 116 redirect uncoated fiber 114 from a vertical direction to a more nearly horizontal direction as uncoated fiber 114 exits treatment zone 130. In the configuration shown in FIG. 1, fluid bearing devices 116 deliver uncoated fiber 114 to coating unit 120. In an alternative configuration, the fiber processing system could be modified to include a second treatment zone parallel to the treatment zone 130 and the fiber bearing devices could redirect the fiber in a vertically upward direction to deliver the fiber to the second treatment zone to further extend the path of cooling in an attempt to slow the cooling rate to a degree sufficient to produce fibers with lower fictive temperature.

In the system configuration of FIG. 1, however, fluid bearing devices 116 are counterproductive to the objective of achieving fibers with low fictive temperature. Instead of enabling controlled cooling at slow rates, fluid bearing devices 116 as deployed in FIG. 1 facilitate rapid cooling of the fiber. As the optical fiber 114 is transported over the fluid bearing devices 116, the region of levitating fluid cushion on each fluid bearing 116 acts to cool the optical fiber 114. Because the levitating fluid stream employed by the fluid bearing device to support and seat the fiber is in motion, the optical fiber is cooled at a rate that is faster than the fiber would cool in quiescent air at room temperature. The greater the temperature differential between the optical fiber and the levitating fluid in the fluid bearing, the greater the ability of the levitating fluid bearing to cool the optical fiber 114. In the deployment of FIG. 1, the levitating fluid supplied to fluid bearings 116 is air or an inert gas at room temperature. As described hereinabove, in order to support and levitate the fiber to prevent mechanical contact of the fiber with the fluid bearing device, the velocity of the levitating fluid supplied to channel 250 is high. The use of such high levitating fluid flow velocities greatly increases the rate of cooling of the fiber through convective processes. The larger the difference between the temperature of the fiber and the temperature of the levitating fluid being supplied by the fluid bearing device, and the higher the levitating fluid flow velocity, the faster the rate of cooling of the fiber.

In the fiber processing systems of the prior art, the levitating fluid supplied by fluid bearing devices is at room temperature and the fiber exiting the treatment zone and entering the assembly of fluid bearing devices is typically at a temperature of 500° C. or higher, and more typically at a temperature of 1000° C. or higher. At typical fiber draw speeds and typical levitating fluid velocities through the fluid bearing device, the temperature of the fiber can be reduced by several hundred to over 1000° C. over a length of 1-2 m as the fiber passes over a fluid bearing device. Typical temperatures of fibers exiting a fluid bearing device are in the range from 23° C. to 600° C. or in the range from 50° C. to 800° C. Fibers exiting the fluid bearing device may be directed to a reheating stage for heating to a temperature above the exit temperature from the fluid bearing device. The temperature of fibers entering a reheating stage may be in the range from 23° C. to 600° C. or in the range from 50° C. to 800° C. The fast fiber cooling rates provided by the fluid bearing devices as deployed in the prior art have been viewed as beneficial because they may simplify fiber processing systems by obviating the need for helium cooling devices.

While the prior art has recognized rapid cooling of the fiber with fluid bearing devices as advantageous, the present description recognizes that the timescale over which fiber cooling occurs is far shorter than the times needed to facilitate the structural relaxation necessary to achieve low fiber fictive temperature and produce fibers with low attenuation. The present description provides a new processing system designed to provide fibers with low fictive temperatures.

The present system includes reheating stage for returning a cooled fiber to a temperature at or above 1000° C. during processing. In one embodiment, the fiber is a silica or doped silica fiber drawn from a preform, passes through a processing zone providing a process temperature between 1000° C. and 1700° C., cools to below 1000° C., and is reheated in a stage providing a process temperature above 1000° C. By reheating the fiber, the time at which the fiber is exposed to a process temperature in the window between 1000° C. and 1700° C. is extended and subsequent cooling permits further reduction in the fictive temperature of the fiber. The present system and method may include multiple cycles of cooling the fiber to a fiber temperature below 1000° C. and reheating it in a stage providing a process temperature above 1000° C. to further extend the time at which the fiber is exposed to temperatures between 1000° C. and 1700° C. to permit further reductions in the fictive temperature through further cycles of cooling. The present system may also include fluid bearing or other fiber-turning devices for redirecting the path of the fiber through the processing system to permit multiple passes of the fiber through processing zones that expose the fiber to a process temperature between 1000° C. and 1700° C. while minimizing the need for impractical vertical process headspace.

In accordance with certain embodiments of the present disclosure, the fiber is a silica or doped silica fiber and the residence time of the fiber at a process temperature in the range from 1000° C. to 1700° C. is longer than 0.1 sec, or longer than 0.2 sec, or longer than 0.3 sec, or longer than 0.4 sec, or longer than 0.5 sec, or longer than 0.6 sec, or longer than 0.8 sec, or longer than 1 sec, or longer than 2 sec, or longer than 3 sec, or longer than 4 sec, or longer than 5 sec, or longer than 6 sec.

In accordance with other embodiments of the present disclosure, the fiber is a silica or doped silica fiber and the residence time of the fiber at a process temperature in the range from 1000° C. to 1450° C. is longer than 0.1 sec, or longer than 0.2 sec, or longer than 0.3 sec, or longer than 0.4 sec, or longer than 0.5 sec, or longer than 0.6 sec, or longer than 0.8 sec, or longer than 1 sec, or longer than 2 sec, or longer than 3 sec, or longer than 4 sec, or longer than 5 sec, or longer than 6 sec.

In accordance with still other embodiments of the present disclosure, the fiber is a silica or doped silica fiber and the residence time of the fiber at a process temperature in the range from 1000° C. to 1300° C. is longer than 0.1 sec, or longer than 0.2 sec, or longer than 0.3 sec, or longer than 0.4 sec, or longer than 0.5 sec, or longer than 0.6 sec, or longer than 0.8 sec, or longer than 1 sec, or longer than 2 sec, or longer than 3 sec, or longer than 4 sec, or longer than 5 sec, or longer than 6 sec.

In accordance with still other embodiments of the present disclosure, the fiber is a silica or doped silica fiber and the residence time of the fiber in a state having a fiber temperature in the range from 1000° C. to 1700° C. is longer than 0.1 sec, or longer than 0.2 sec, or longer than 0.3 sec, or longer than 0.4 sec, or longer than 0.5 sec, or longer than 0.6 sec, or longer than 0.8 sec, or longer than 1 sec, or longer than 2 sec, or longer than 3 sec, or longer than 4 sec, or longer than 5 sec, or longer than 6 sec.

In accordance with still other embodiments of the present disclosure, the fiber is a silica or doped silica fiber and the residence time of the fiber in a state having a fiber temperature in the range from 1050° C. to 1600° C. is longer than 0.1 sec, or longer than 0.2 sec, or longer than 0.3 sec, or longer than 0.4 sec, or longer than 0.5 sec, or longer than 0.6 sec, or longer than 0.8 sec, or longer than 1 sec, or longer than 2 sec, or longer than 3 sec, or longer than 4 sec, or longer than 5 sec, or longer than 6 sec.

In accordance with still other embodiments of the present disclosure, the fiber is a silica or doped silica fiber and the residence time of the fiber in a state having a fiber temperature in the range from 1100° C. to 1500° C. is longer than 0.1 sec, or longer than 0.2 sec, or longer than 0.3 sec, or longer than 0.4 sec, or longer than 0.5 sec, or longer than 0.6 sec, or longer than 0.8 sec, or longer than 1 sec, or longer than 2 sec, or longer than 3 sec, or longer than 4 sec, or longer than 5 sec, or longer than 6 sec.

Figure 4:
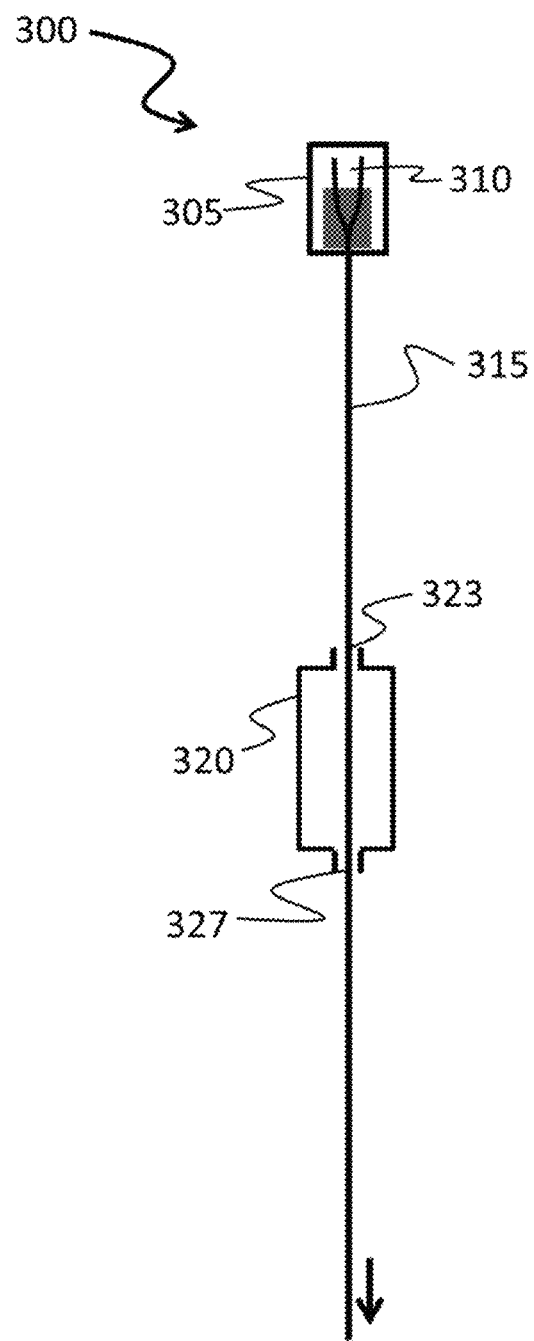
FIG. 4 depicts a fiber processing system and method having a draw furnace and reheating stage.

FIG. 4 depicts an embodiment of a fiber processing system that includes a draw furnace and reheating stage. The arrow indicates the direction of fiber transport along the process pathway. System 300 includes draw furnace 305 with fiber preform 310. Fiber preform 310 may be a silica or doped silica preform and may include a single compositional region or multiple compositional regions. The multiple compositional regions may be concentric. For example, fiber preform 310 may include a central region corresponding to the core composition of a fiber and one or more outer concentric regions corresponding to the compositions of one or more cladding layers of a fiber. The core and/or cladding regions may include pure silica or doped silica.

Fiber 315 is drawn from fiber preform 310 and directed to entrance 323 of reheating stage 320. Fiber 315 passes through reheating stage 320 and emerges at exit 327. In one embodiment, fiber 315 exits draw furnace 305 at a temperature of ~1700° C. Fiber 315 cools as it exits draw furnace 305 and proceeds to reheating stage 320. Fiber 315 cools as it proceeds along the process pathway after emerging from reheating stage 320 at exit 327. Although not explicitly shown in FIG. 4, the fiber process pathway may further include other processing units downstream from exit 327 be (e.g. additional reheating stages, slow cooling devices, fiber-turning devices, coating units, testing units, or spooling units).

System 300 defines a process pathway that extends from draw furnace 305 to beyond exit 327 of reheating stage 320. The arrow defines the direction of conveyance of the fiber along the process pathway. As the fiber is processed, it moves away from draw furnace 305. Portions of the process pathway that are closer to draw furnace 305 may be said herein to be upstream of portions of the process pathway that are further away from draw furnace 305, where distance from the draw furnace is understood herein to mean distance as measured along the fiber. For example, the portion of fiber 315 positioned between draw furnace 305 and entrance 323 of reheating stage 320 is upstream of the portion of fiber 315 positioned further from draw furnace 305 than exit 327 of reheating stage 320. Since fiber 315 passes through both draw furnace 305 and reheating stage 320 along the process pathway, draw furnace 305 and reheating stage 320 may be referred to herein as operatively coupled along the process pathway.

In the embodiment of FIG. 4, a gap is shown between draw furnace 305 and entrance 323 of reheating stage 320. In an alternative embodiment, no gap is present and reheating stage 320 is directly connected to draw furnace 305.

By including reheating stage 320, the time of exposure of fiber 315 to a process temperature effective to permit lowering of the fictive temperature of the fiber upon subsequent cooling is increased. In one embodiment, the temperature of fiber 315 at exit 327 is greater than the temperature of fiber 315 at entrance 323. In another embodiment, fiber 315 is a silica or doped silica fiber, the temperature of fiber 315 at entrance 323 is less than 1600° C. and the temperature of fiber 315 at exit 327 is greater than 900° C. In still another embodiment, fiber 315 is a silica or doped silica fiber, the temperature of fiber 315 at entrance 323 is less than 1500° C. and the temperature of fiber 315 at exit 327 is greater than 1000° C.

In one embodiment, fiber 315 is a silica or doped silica fiber, the temperature of fiber 315 at entrance 323 is less than 1700° C. and reheating stage 320 heats fiber 315 to a temperature above 1700° C. In a second embodiment, fiber 315 is a silica or doped silica fiber, the temperature of fiber 315 at entrance 323 is less than 1500° C. and reheating stage 320 heats fiber 315 to a temperature above 1500° C. In a third embodiment, fiber 315 is a silica or doped silica fiber, the temperature of fiber 315 at entrance 323 is less than 1400° C. and reheating stage 320 heats fiber 315 to a temperature above 1400° C. In a fourth embodiment, fiber 315 is a silica or doped silica fiber, the temperature of fiber 315 at entrance 323 is less than 1300° C. and reheating stage 320 heats fiber 315 to a temperature above 1300° C. In a fifth embodiment, fiber 315 is a silica or doped silica fiber, the temperature of fiber 315 at entrance 323 is less than 1100° C. and reheating stage 320 heats fiber 315 to a temperature above 1100° C. In a sixth embodiment, fiber 315 is a silica or doped silica fiber, the temperature of fiber 315 at entrance 323 is less than 1000° C. and reheating stage 320 heats fiber 315 to a temperature above 1000° C. The peak fiber temperature produced by reheating stage 320 may occur at a point internal to or within reheating stage 320 or may occur at exit 327.

The increase in fiber temperature provided by reheating stage 320 may be at least 50° C., or at least 100° C., or at least 200° C., or at least 300° C., or at least 400° C., or at least 500° C.

Reheating stage 320 provides heat to fiber 315 through a convective, radiative, or electromagnetic mechanism. Reheating stage 320 may be a furnace and may operate through heating elements or by flowing a hot gas over fiber 315. Alternatively, reheating stage 320 may include a laser or other optical source for heating fiber 315. The laser or other optical source may operate at a wavelength absorbed by fiber 315 and transfer energy to fiber 315 through absorption.

The speed of conveyance of fiber 315 along the process pathway shown in FIG. 4 may be at least 2 m/sec, or at least 5 m/sec, or at least 10 m/sec, or at least 20 m/sec, or at least 30 m/sec, or at least 35 m/sec, or at least 40 m/sec, or at least 45 m/sec, or at least 50 m/sec.

Figure 5:
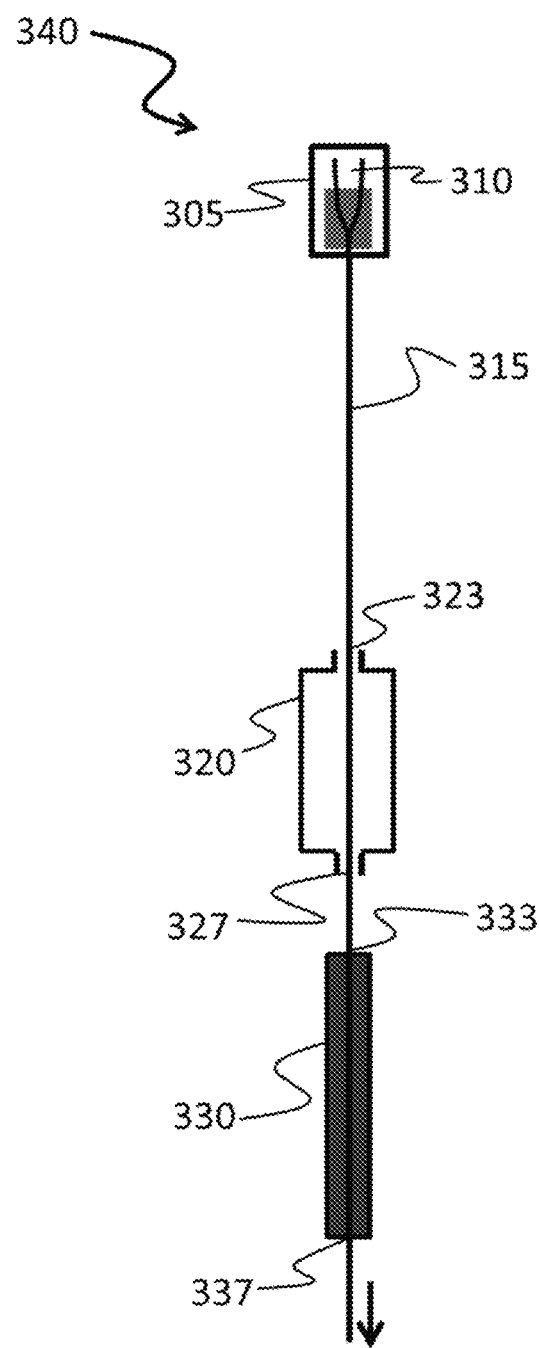
FIG. 5 depicts a fiber processing system and method having a draw furnace, reheating stage, and slow cooling device.

FIG. 5 shows a fiber processing system that includes a reheating stage and a slow cooling device. As defined herein, a slow cooling device provides cooling of an optical fiber at a rate that is slower than the cooling rate of the optical fiber in unheated air. The reheating stage and slow cooling device are operatively coupled to each other and each is operatively coupled to the draw furnace. In one embodiment, the fiber processing system shown in FIG. 5 is a modification of the system shown in FIG. 4 that includes a slow cooling device. Fiber processing system 340 includes slow cooling device 330 with entrance 333 and exit 337. In the embodiment shown in FIG. 5, fiber 315 departs heating stage 320 at exit 327, enters slow cooling device 330 at entrance 333, and exits slow cooling device 330 at exit 337. The temperature of fiber 315 at exit 337 is less than the temperature of fiber 315 at entrance 333. Slow cooling device 330 provides controlled cooling of fiber 315 and enables cooling rates that are slower than the natural cooling rate in unheated air.

In one embodiment, slow cooling device 330 includes one or more zones with controlled temperatures. For example, slow cooling device 330 may include a furnace with one or more temperature control zones. The controlled temperatures permit more gradual cooling of fiber 315 relative to cooling in unheated air and can be designed to increase the residence time of the fiber at desired process temperatures or in desired process temperature windows, thereby facilitating the goal of reducing the fictive temperature of fiber 315 during cooling. In another embodiment, slow cooling device 330 operates under sub-atmospheric pressure conditions. Reduction of the pressure of the gas environment surrounding the fiber permits more gradual cooling of fiber 315 relative to cooling at atmospheric pressure by reducing the rate of heat transfer from the fiber to the gas atmosphere, thereby facilitating the goal of reducing the fictive temperature of fiber 315 during cooling.

The speed of conveyance of fiber 315 along the process pathway shown in FIG. 5 may be at least 2 m/sec, or at least 5 m/sec, or at least 10 m/sec, or at least 20 m/sec, or at least 30 m/sec, or at least 35 m/sec, or at least 40 m/sec, or at least 45 m/sec, or at least 50 m/sec.

Although not explicitly shown in FIG. 5, the fiber process pathway may further include other processing units downstream from exit 337 be (e.g. additional reheating stages, slow cooling devices, fiber-turning devices, coating units, testing units, or spooling units).

In the embodiment of FIG. 5, a gap is shown between exit 327 of reheating stage 320 and entrance 333 of slow cooling device 330. In an alternative embodiment, no gap is present and slow cooling device 330 is directly connected to reheating stage 320.

In one embodiment, slow cooling device 330 is maintained at a fixed temperature. The fixed temperature may be established, for example, with heating elements and/or heated gas flow within slow cooling device 330 in the environment surrounding fiber 315. The fixed temperature is a temperature between room temperature and the temperature of fiber 315 at entrance 333. The fixed temperature is preferably a temperature that permits structural relaxation of fiber 315 and/or closer approach of fiber 315 to an equilibrium state during cooling. The fixed temperature may be a temperature of at least 700° C., or at least 800° C., or at least 900° C., or at least 1000° C., or at least 1100° C., or at least 1200° C., or at least 1300° C., or at least 1400° C., or a temperature in the range from 700° C.-1500° C., or a temperature in the range from 900° C.-1400° C., or a temperature in the range from 1000° C.-1300° C.

In another embodiment, slow cooling device 330 includes two or more zones, where each zone is maintained at a different temperature. In one embodiment, the temperatures of the zones decrease in the direction from entrance 333 to exit 337 of slow cooling device 330 so that fiber 315 is exposed to temperatures that are highest in the vicinity of entrance 333 and progressively decrease as it passes through slow cooling device 330 in the direction of exit 337, where the maximum temperature to which fiber 315 is exposed in slow cooling device 330 is a temperature below the temperature of fiber 315 at entrance 333. The minimum temperature to which fiber 315 is exposed to in slow cooling device 330 may be greater than room temperature. In certain embodiments, fiber 315 is a silica or doped silica fiber and the temperature range to which fiber 315 is exposed in slow cooling device 330 may extend from 1000° C. to 1700° C., or from 1000° C. to 1500° C., or from 1000° C. to 1300° C. The gradient in temperature between entrance 333 and exit 337 of slow cooling device 330 may be continuous or step-wise. Although the embodiment depicted in FIG. 5 shows placement of slow cooling device 330 along the fiber processing pathway at a position further away from draw furnace 305 than reheating stage 320, it is understood that slow cooling device 330 may alternatively be positioned closer to draw furnace 305 than reheating stage 320.

The cooling of fiber 315 in slow cooling device 330 may also be accomplished by controlling the pressure within the interior of slow cooling device 330. The interior of slow cooling device 330 may include a static or flowing gas and the cooling rate may be varied by controlling the pressure and/or flow rate of the gas. Higher gas pressures or faster gas flow rates lead to faster cooling rates, while lower gas pressures or slower gas flow rates lead to slower cooling rates. Representative gases for use in slow cooling device 330 include He, Ar, $N_2$, air, $CO_2$, Kr, and Xe. To facilitate a decrease in the fictive temperature of fiber 315, slower cooling rates are preferred. In one embodiment, the gas pressure in the environment of fiber 315 within the interior of slow cooling device 330 is less than room pressure. The gas pressure surrounding fiber 315 may be less than 1.0 atm, or less than 0.9 atm, or less than 0.8 atm, or less than 0.7 atm, or less than 0.6 atm, or less than 0.5 atm, or less than 0.4 atm, or less than 0.3 atm.

Figure 6:
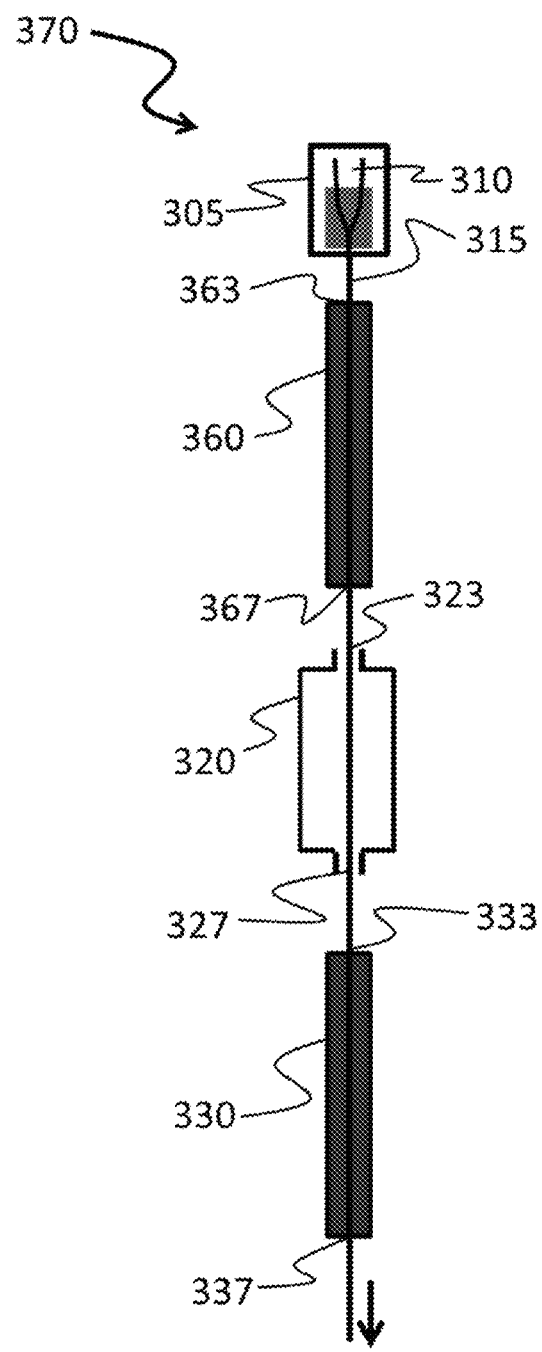
FIG. 6 depicts a fiber processing system and method having a draw furnace, reheating stage, and two slow cooling devices.

FIG. 6 shows a fiber processing system that includes two slow cooling devices operatively coupled to a reheating stage and a draw furnace. In one embodiment, the system shown in FIG. 6 is a modification of the system shown in FIG. 5 that includes a second slow cooling device. Fiber processing system 370 includes slow cooling device 360 with entrance 363 and exit 367 in addition to slow cooling device 330 with entrance 333 and exit 337. Fiber 315 departs draw furnace 305, enters slow cooling device 360 at entrance 363 and exits slow cooling device 360 at exit 367. Fiber 315 proceeds along the process pathway and enters heating stage 320 at entrance 323 and exits heating stage 320 at exit 327. Fiber 315 next enters slow cooling device 330 at entrance 333, and exits slow cooling device 330 at exit 337.

The speed of conveyance of fiber 315 along the process pathway shown in FIG. 6 may be at least 2 m/sec, or at least 5 m/sec, or at least 10 m/sec, or at least 20 m/sec, or at least 30 m/sec, or at least 35 m/sec, or at least 40 m/sec, or at least 45 m/sec, or at least 50 m/sec.

Although not explicitly shown in FIG. 6, the fiber process pathway may further include other processing units downstream from exit 337 be (e.g. additional reheating stages, slow cooling devices, fiber-turning devices, coating units, testing units, or spooling units).

Slow cooling device 360 may include a single fixed temperature zone or multiple controlled temperature zones that provide a gradient in temperature in a continuous or step-wise fashion. The temperature of fiber 315 at exit 367 is less than the temperature of fiber 315 at entrance 363. As described hereinabove for slow cooling device 330, slow cooling device 360 provides control over the rate of cooling of fiber 315 and enables cooling rates that are less than the cooling rate of fiber 315 in unheated air. Inclusion of a second slow cooling device provides finer control over the temperature environment to which fiber 315 is exposed during processing. The temperature conditions of slow cooling device can be designed to extend the period of time over which fiber 315 is exposed to temperatures conducive to relaxing the glass structure of fiber 315 or driving the state of fiber 315 closer to an equilibrium state, or otherwise facilitating a reduction in the fictive temperature of fiber 315 during cooling.

The maximum temperature to which fiber 315 is exposed in slow cooling device 360 is a temperature below the temperature of fiber 315 at entrance 363. The minimum temperature to which fiber 315 is exposed to in slow cooling device 360 may be greater than room temperature. The process temperature range to which fiber 315 is exposed to in slow cooling device 360 may extend from 800° C. to 1600° C., or from 900° C. to 1500° C., or from 1000° C. to 1500° C., or from 1000° C. to 1300° C.

Fiber processing systems in accordance with the present description may also include redirection of the fiber along the process pathway. Redirection of the fiber may be accomplished by a fiber-turning device, such as the fluid bearing devices described hereinabove. Redirection of the fiber provides a non-linear process pathway and permits extension of the process pathway in non-vertical or folded vertical directions to mitigate the need for additional vertical headspace in the manufacturing facility. Redirection of the fiber within the scope of the present disclosure extends to any directions of conveyance, including directions that are horizontal, non-horizontal, vertical, non-vertical and/or at arbitrary angles relative to the floor of the manufacturing facility. The fiber-turning devices may redirect the fiber from a first direction of conveyance to a second direction of conveyance, where the angle between the first and second directions of conveyance is arbitrary.

One or more fiber-turning devices may be included in the processing system to provide a process pathway with multiple segments. The process pathway segments are not collinear. In one embodiment, the process pathway includes two or more process pathway segments that are parallel, but not collinear. A reheating stage and/or slow cooling device may be included in one or more of the process pathway segments. A fiber processing pathway that includes one or more redirections of the fiber may be referred to herein as a folded process pathway. Inclusion of reheating stages in folded process pathways is advantageous because as the fiber is redirected by a fiber-turning device, it cools rapidly. The temperature of a silica fiber upon emergence from a fiber-turning device is typically in the range from 50° C. to 800° C. Reheating reverses the cooling and raises the temperature of the fiber to a degree sufficient to control the fictive temperature as described herein.

Figure 7:
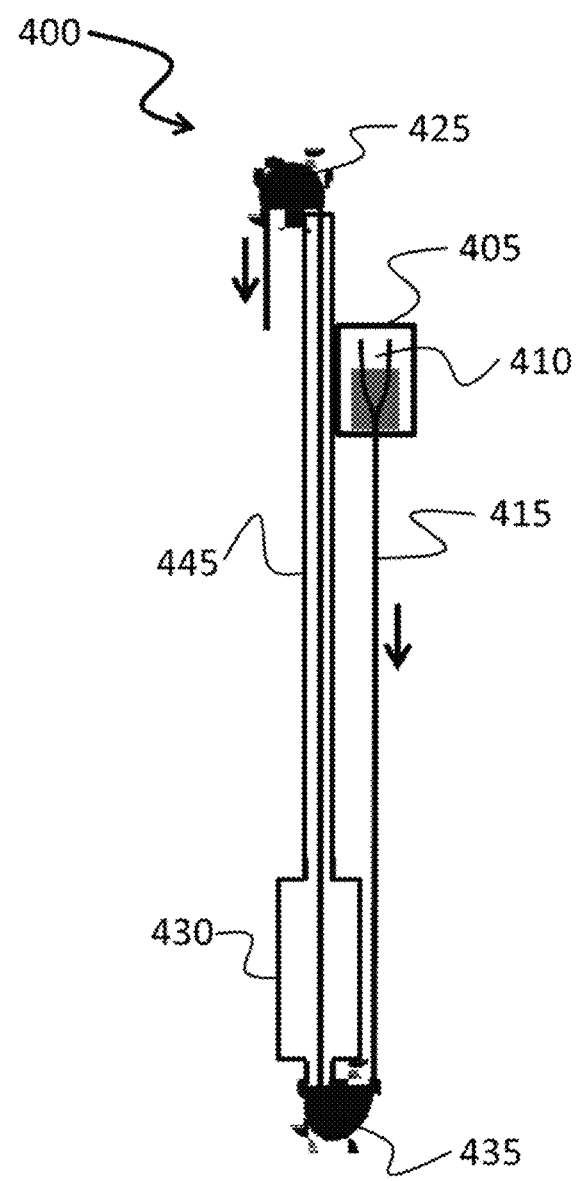
FIG. 7 depicts a fiber processing system and method having a fiber-turning device, reheating stage, and slow cooling device.

FIG. 7 illustrates a fiber processing system having a fiber-turning device. System 400 includes draw furnace 405 equipped with preform 410 for drawing fiber 415. Fiber 415 proceeds along the process pathway in the direction of the arrow to fiber-turning device 435. Fiber-turning device 435 redirects fiber 415 from one process direction to another process direction. As fiber 415 is redirected by fiber-turning device 435, it cools. Following redirection, fiber 415 enters reheating stage 430 and proceeds to slow cooling device 445 and then to fiber-turning device 425, where it is redirected again. In the embodiment of FIG. 7, slow cooling device 445 is directly connected to reheating stage 430. As noted hereinabove, however, in alternative embodiments, a gap may be present between slow cooling device 445 and reheating stage 430.

Draw furnace 405, fiber-turning device 435, reheating stage 430, slow cooling device 445, and fiber-turning device 425 are operatively coupled along the process pathway shown in FIG. 7. Draw furnace 405 is upstream from fiber-turning device 435, reheating stage 430, slow cooling device 445, and fiber-turning device 425 along the process pathway. Fiber-turning device 435 is downstream from draw furnace 405 and upstream from reheating stage 430, slow cooling device 445, and fiber-turning device 425 along the process pathway. Slow cooling device 445 is upstream from fiber-turning device 425 and downstream from reheating stage 430, fiber-turning device 435, and draw furnace 405 along the process pathway. Fiber-turning device 425 is downstream from slow cooling device 445, reheating stage 430, fiber-turning device 435, and draw furnace 405 along the process pathway.

Figure 8:
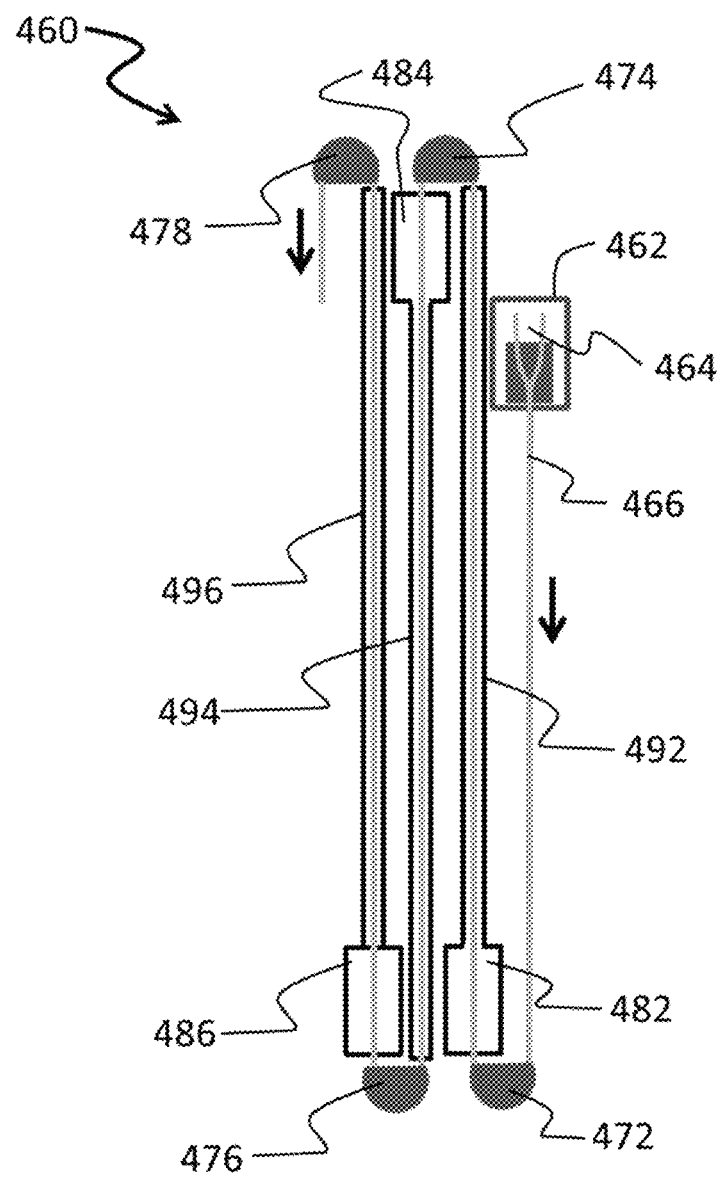
FIG. 8 depicts a fiber processing system and method having multiple process pathway segments.

The speed of conveyance of fiber 415 along the process pathway shown in FIG. 8 may be at least 2 m/sec, or at least 5 m/sec, or at least 10 m/sec, or at least 20 m/sec, or at least 30 m/sec, or at least 35 m/sec, or at least 40 m/sec, or at least 45 m/sec, or at least 50 m/sec.

Although not explicitly shown in FIG. 7, the fiber process pathway may further include other processing units downstream from fiber-turning device 425 (e.g. additional reheating stages, slow cooling devices, fiber-turning devices, coating units, testing units, or spooling units).

The portion of the process pathway between draw furnace 405 and fiber-turning device 435 may be referred to as a process pathway segment. The portion of the process pathway between fiber-turning device 435 and fiber-turning device 425 is another process pathway segment. The truncated portion of the process pathway shown following fiber-turning device 425 is the initial portion of a third process pathway segment. The process pathway segment between draw furnace 405 and fiber-turning device 435 is upstream from the process pathway segment between fiber-turning device 435 and fiber-turning device 425. The process pathway segment between draw furnace 405 and fiber-turning device 435 is parallel to, but not collinear with, the process pathway segment between fiber-turning device 435 and fiber-turning device 425. The process pathway shown in FIG. 7 is an example of a folded process.

FIG. 8 depicts a fiber processing system having multiple process pathway segments. System 460 includes draw furnace 462 with fiber preform 464 the delivers optical fiber 466 to a process pathway that includes a first process pathway segment between draw furnace 462 and fiber-turning device 472, a second process pathway segment between fiber-turning device 472 and fiber-turning device 474, a third process pathway segment between fiber-turning device 474 and fiber-turning device 476, a fourth process pathway segment between fiber-turning device 476 and fiber-turning device 478, and additional process pathway segments beyond fiber-turning device 478. In the process pathway, fiber 466 is formed from preform 464, exits draw furnace 462, is redirected by fiber-turning device 472 and passes through reheating stage 482 and slow cooling device 492, is redirected by fiber-turning device 474 and passes through reheating stage 484 and slow cooling device 494, is redirected by fiber-turning device 476 and passes through reheating stage 486 and slow cooling device 496, is redirected by fiber-turning device 478 and routed to further process pathway segments and/or is taken up on a spool. The draw furnace, fiber-turning devices and slow cooling devices shown in FIG. 8 are operatively coupled along the process pathway defined by the path of conveyance of fiber 466.

Draw furnace 462 is upstream from fiber-turning device 472, reheating stage 482, slow cooling device 492, fiber-turning device 474, reheating stage 484, slow cooling device 484, fiber-turning device 476, reheating stage 486, slow cooling device 496 and fiber-turning device 478 along the process pathway. The process pathway segments shown in FIG. 8 are parallel to each other, but not collinear.

The speed of conveyance of fiber 466 along the process pathway shown in FIG. 8 may be at least 2 m/sec, or at least 5 m/sec, or at least 10 m/sec, or at least 20 m/sec, or at least 30 m/sec, or at least 35 m/sec, or at least 40 m/sec, or at least 45 m/sec, or at least 50 m/sec.

Although not explicitly shown in FIG. 8, the fiber process pathway may further include other processing units downstream from fiber-turning device 478 (e.g. additional reheating stages, slow cooling devices, fiber-turning devices, coating units, testing units, or spooling units).

In the embodiment shown in FIG. 8, the reheating stages are directly connected to the slow cooling devices and the reheating stage is positioned closer to the draw furnace than the slow cooling device in each process pathway segment. As noted hereinabove, however, the reheating stages and slow cooling devices may be separated (spaced apart) and the relative position of the reheating stage and slow cooling device along one or more of the process pathway segments may be reversed. Additional reheating stages and/or slow cooling devices may optionally be included in one or more of the process pathway segments as well.

In other embodiments, a reheating stage and/or slow cooling device may be positioned in any of the process pathway segments of a folded process pathway. A process pathway segment may include one or more reheating stages, one or more slow cooling devices, and/or a combination of one or more heating stages and one or more slow cooling devices. The process pathway may include process pathway segments that lack a reheating stage and lack a slow cooling device, but at least one process pathway segment must include a reheating stage. Regarding process pathway segments that include combinations of heating stages and slow cooling devices, any positioning of the heating stages and slow cooling devices relative to the draw furnace is within the scope of the disclosure. For example, a heating stage may be closer to the draw furnace than a slow cooling device or vice versa. Multiple heating stages within a process pathway segment may be positioned consecutively or may be separated by one or more intervening slow cooling devices. Multiple slow cooling devices within a process pathway segment may be positioned consecutively or may be separated by one or more intervening reheating stages. Any ordering of slow cooling devices and/or reheating stages along a process pathway segment is within the scope of the present disclosure.

In other embodiments, the reheating stage may include one or more fiber-turning devices. In fiber-turning devices that utilize a fluid to levitate a fiber, for example, the temperature of the levitating fluid may be controlled to heat the fiber as the fiber engages the fiber-turning device during redirection. The fluid bearing fiber-turning devices may have the design shown in FIGS. 2 and 3 and may be supplied with a levitating fluid that has been heated to a temperature greater than the temperature of the fiber with which it engages.

Figure 9:
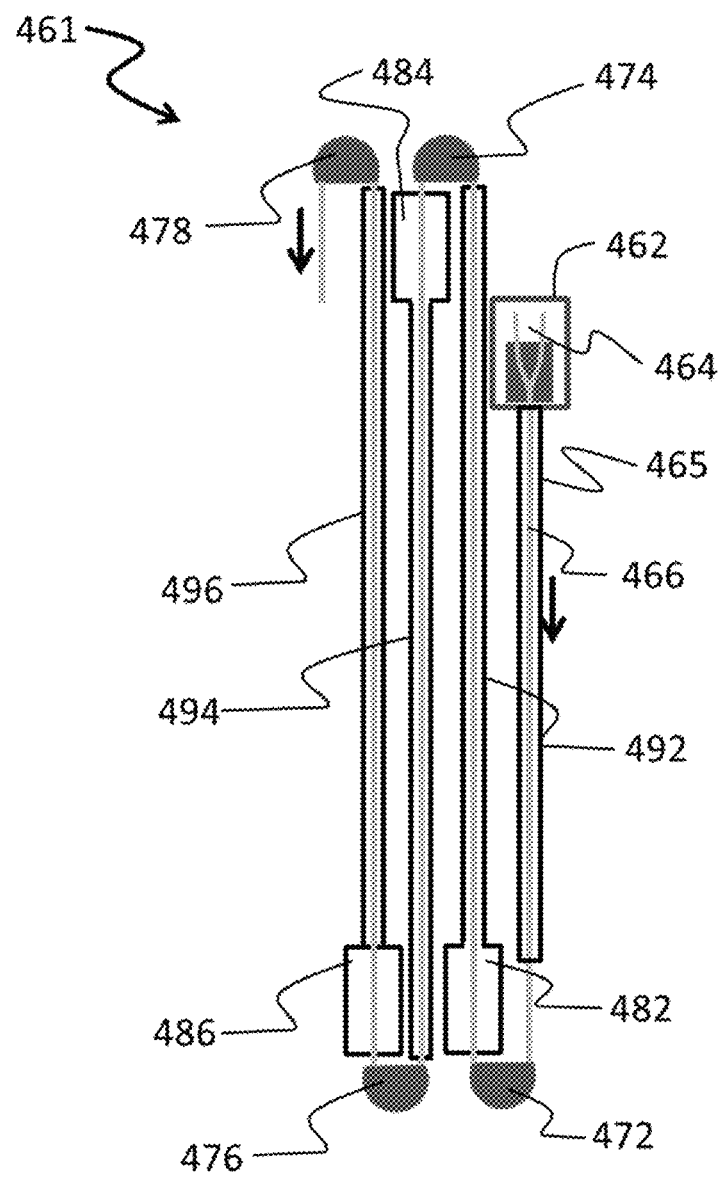
FIG. 9 depicts an exemplary fiber processing system that includes a draw furnace, multiple fiber-turning devices, multiple reheating stages, and multiple slow cooling devices.

FIG. 9 depicts a variation 461 of the system 460 shown in FIG. 8 that includes an additional slow cooling device 465. System 461 functions in the same manner as system 460 with the added benefit of an additional passage of the fiber through slow cooling device 465. Slow cooling device 465 further extends the residence time of the fiber at process temperatures in the glass transition range. In the embodiment of FIG. 9, slow cooling device 465 is directly connected to draw furnace 462. In other embodiments, slow cooling device may remain between draw furnace 462 and fiber-turning device 472 and be spaced apart from draw furnace 462.

Figure 10:
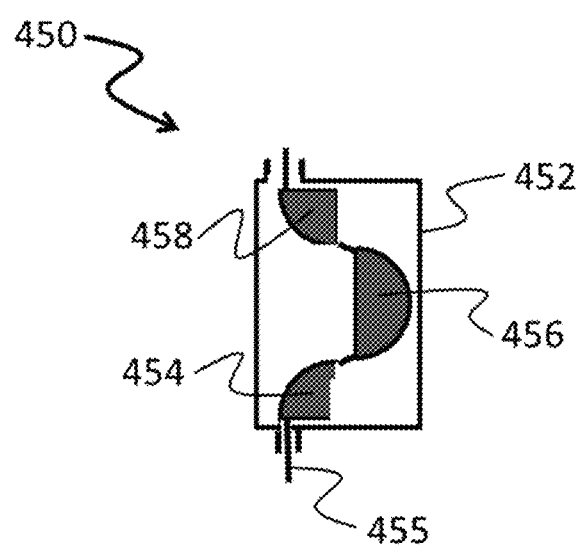
FIG. 10 depicts a reheating stage and method that incorporates one or more fluid bearing fiber-turning devices.

FIG. 10 shows a reheating stage that includes a plurality of operatively coupled fluid bearing fiber-turning devices. Reheating stage 450 includes chamber 452 and receives fiber 455, which is directed through fluid bearing fiber-turning devices 454, 456, and 458. One or more of fluid bearing fiber-turning devices 452, 454, and 456 is supplied with a heated levitation fluid that has a temperature higher than the temperature of fiber 455 at the point of engagement with fiber 455. The levitating fluids supplied to fluid bearing fiber-turning devices 454, 456, and 458 may be the same or different. In one embodiment, the temperature of the levitating fluid increases among the fluid bearing fiber-turning devices in the direction of transport of fiber 455.

In one embodiment, chamber 452 is heated independent of fluid bearing fiber-turning devices 454, 456, and 458 to provide a supplemental mechanism of heating to further control the temperature of fiber 455. For example, heating elements may be included in chamber 452 and/or a heated gas may be passed through chamber 452. In this embodiment, none or one or more of the fluid bearing fiber-turning devices incorporated within chamber 452 may be supplied with a heated levitating fluid. When incorporated within a heated chamber, the fiber-turning devices may be constructed from steel, other metals, or ceramics known in the art to function in high temperature environments.

In another embodiment, the chamber of the reheating stage is heated to a temperature and the one or more fiber-turning devices are positioned within the chamber in a configuration that extends the process pathway through the reheating stage. In this embodiment, the chamber of the reheating stage is heated to a temperature greater than the temperature of the fiber and the fiber is heated as it passes through the chamber. The temperature of the interior of the reheating stage may be spatially uniform or spatially varying. In one embodiment, the temperature of the interior of the reheating stage is monotonically increasing in the direction of fiber conveyance, where the peak temperature within the interior is greater than the temperature of the fiber as it enters the reheating stage. In another embodiment, the temperature of the interior of the reheating stage is monotonically decreasing in the direction of fiber conveyance, where the peak temperature within the interior is greater than the temperature of the fiber as it enters the reheating stage. Inclusion of fiber-turning devices increases the length of time that the fiber is exposed to the heated interior of the chamber of the reheating device. Control of the length of time over which the fiber is exposed to the heated interior provides additional control over the temperature of the fiber. In this embodiment, the one or more fiber-turning devices may or may not be configured to heat the fiber independent of the heating that occurs as the fiber passes through the heated interior of the reheating stage.

Figure 11:
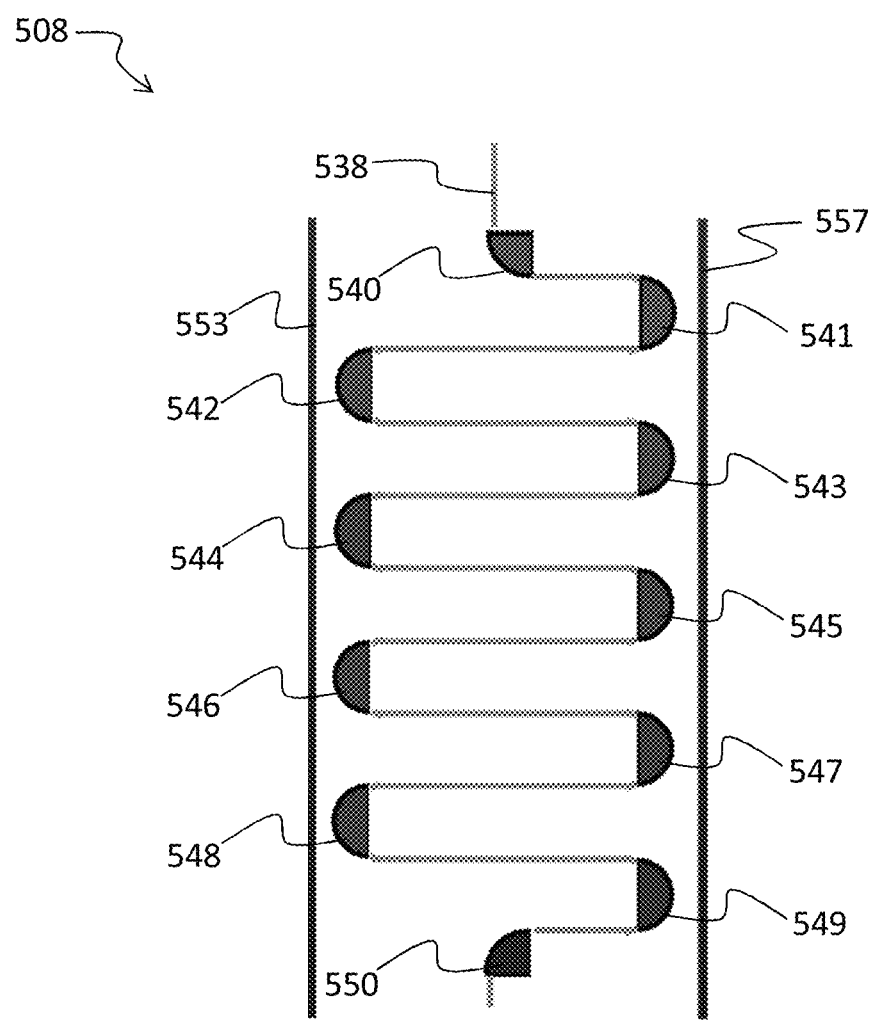
FIG. 11 depicts a fiber processing system and method having fluid bearing fiber-turning devices deployed within a heated processing region.

FIG. 11 illustrates a reheating stage having a plurality of operatively coupled fiber-turning devices. In one embodiment, the fiber-turning devices are fluid bearing fiber-turning devices of the type shown in FIGS. 2 and 3. Reheating stage 508 includes a chamber defined by boundaries 553 and 557 and receives fiber 538, which is conveyed through a series of fluid bearing devices 540-550. The levitating fluid supplied to one or more of fluid bearing devices may optionally be heated to provide an additional degree of control over the temperature of the fiber. The temperature of the levitating fluid supplied to any of the fluid bearing devices may be the same as or different from the temperature of the interior of the chamber of reheating stage 508. In certain embodiments, the temperature of the levitating fluid supplied to at least one of the fluid bearing devices is greater than the temperature of the heated interior of reheating stage 508. In other embodiments, the temperature of the levitating fluid supplied to at least one of the fluid bearing fiber-turning devices is less than the temperature of the heated interior of reheating stage 508.

In a further embodiment, the reheating stage lacks a chamber and includes one or more fiber-turning devices, where at least one of the one or more fiber-turning devices is configured to heat the fiber. For example, the reheating stage may include one or more fluid bearing fiber-turning devices, where at least one of the fluid bearing fiber-turning devices is supplied with a levitating fluid having a temperature greater than the temperature of the fiber.

In another embodiment, disclosed is a method of processing an optical fiber comprising: providing a fiber along a first pathway; cooling said fiber in a first treatment region along said first pathway, said fiber entering said first treatment region at a first average temperature and exiting said first treatment region at a second average temperature, said second average temperature being in the range from 900° C. to 1400° C., said cooling from said first average temperature to said second average temperature occurring at a first cooling rate; cooling said fiber in a second treatment region along said first pathway, said fiber entering said second treatment region at a third average temperature and exiting said second treatment region at a fourth average temperature, said fourth average temperature being in the range from 800° C. to 1200° C., said cooling from said third average temperature to said fourth average temperature occurring at a second cooling rate; and redirecting said fiber from said first pathway to a second pathway, said second pathway being non-collinear with said first pathway, heating said fiber in a third treatment region along said second pathway, said fiber entering third treatment region at a fifth average temperature and exiting third treatment region at a sixth average temperature, said fifth average temperature is between 23° C. and 500° C. and said sixth average temperature is between 600° C. and 1500° C., cooling said fiber in a fourth treatment region along said second pathway, said fiber entering fourth treatment region at a seventh average temperature and exiting fourth treatment region at a eighth average temperature, said seventh average temperature is between 600° C. and 1500° C. and said eighth average temperature is between 1000° C. and 1500° C.

EXAMPLES

Figure 12:
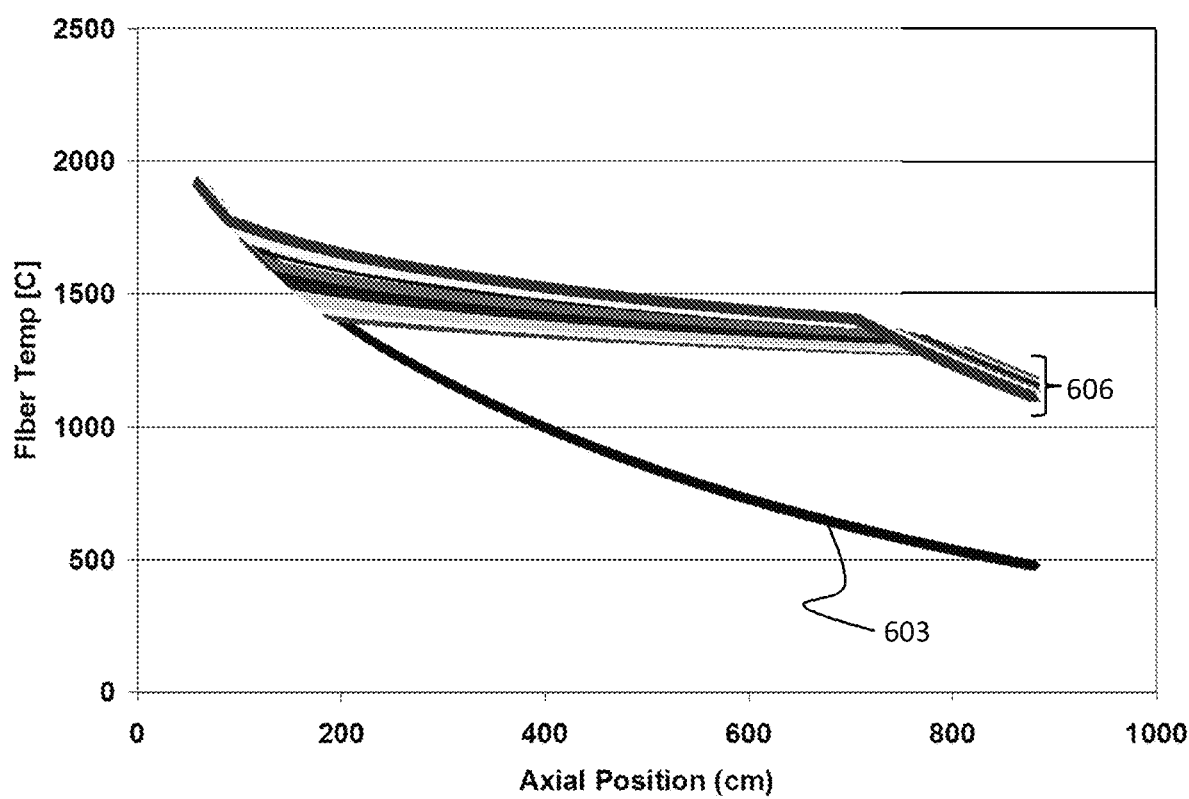
FIG. 12 illustrates the effect of slow cooling on the temperature of a silica fiber.

FIG. 12 illustrates the effect of a slow cooling device on the temperature of a silica fiber for a system configuration that includes a draw furnace and a slow cooling device operatively coupled to the draw furnace without an intervening reheating stage. The fiber is drawn from a preform in the draw furnace and delivered directly to the slow cooling device. FIG. 12 shows fiber temperature as a function of axial position along the fiber, where axial position increases in the direction away from the draw furnace along the process pathway. Curve 603 is a reference trace that shows the temperature profile of the file in the absence of a slow cooling device. The series of curves depicted as 606 are traces that illustrate the temperature of the fiber as controlled by a slow cooling device positioned downstream from the draw furnace. The slow cooling device is maintained at a fixed temperature of 1200° C. The different traces correspond to different separations between the entrance of the slow cooling device and the draw furnace. The separations range from 0 mm to 1030 mm. Traces 606 illustrate that inclusion of a slow cooling device in the processing system extends the length along the fiber for which the fiber is exposed to processing temperatures above 1000° C. In the absence of a slow cooling device, trace 603 shows that the fiber temperature decreases to below 1000° C. in a short distance along the length of the fiber. With the slow cooling device, the length over which the fiber remains above 1000° C. is greatly extended. Since the fiber is being conveyed at a pre-determined speed during processing, length along the fiber correlates with the time period over which the fiber is exposed to processing temperatures sufficient to cause the time period over which the fiber temperature remains above 1000° C. Inclusion of the slow cooling device greatly extends the time period over which the fiber temperature remains above 1000° C. during cooling.

Figure 13:
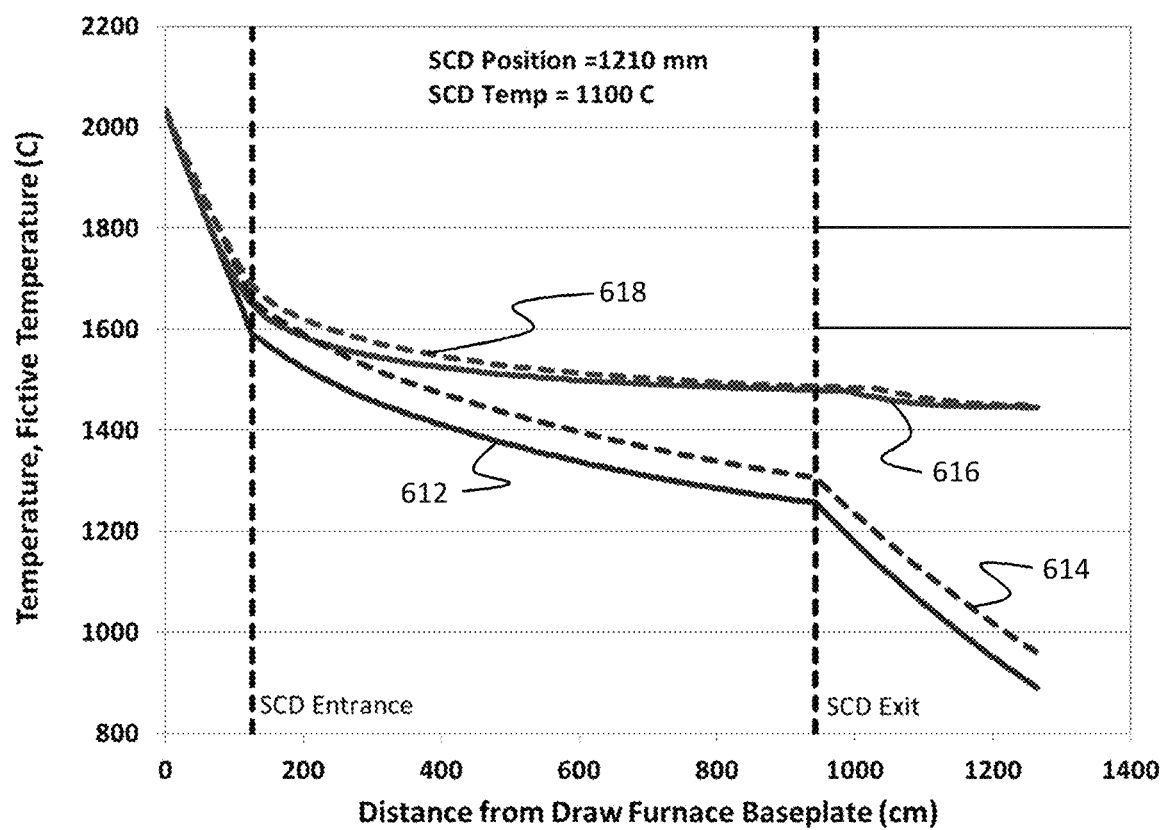
FIG. 13 illustrates the effect of slow cooling on fictive temperature of a silica fiber for two draw speeds.

FIG. 13 shows the effect of slow cooling on the fictive temperature of a silica fiber for draw speeds of 42 m/s and 50 m/s. The system configuration used in FIG. 13 includes a slow cooling device operatively coupled to a draw furnace with no intervening devices. The fiber is drawn from a preform in the draw furnace and conveyed directly to and through a slow cooling device at a draw speed of 42 m/s or 50 m/s. The slow cooling device is kept at a uniform temperature of 1100° C. The entrance of the slow cooling device ("SCD") is positioned along the process pathway 121 cm downstream from the exit (baseplate) of the draw furnace. The entrance and exit positions of the slow cooling device relative to the baseplate of the draw furnace are indicated in FIG. 13. Traces 612 and 614 show the variation in the temperature of the fiber with distance from the baseplate of the draw furnace at draw speeds of 42 m/s and 50 m/s, respectively. The temperature of the fiber decreases as it passes through the slow cooling device, but the rate of cooling is much less than the rate of cooling in air. The rate of cooling of the fiber increases significantly upon exit of the fiber from the slow cooling device and the fiber temperature decreases over a correspondingly shorter distance along the process pathway. Traces 616 and 618 show the variation in the fictive temperature of the fiber with distance from the baseplate of the draw furnace at draw speeds of 42 m/s and 50 m/s, respectively. The fictive temperature of silica fiber cooled directly in air is 1550° C. The results shown in FIG. 13 indicate that conveyance of the fiber through a slow cooling device reduces the fictive temperature of the fiber to 1500° C.

Figure 14:
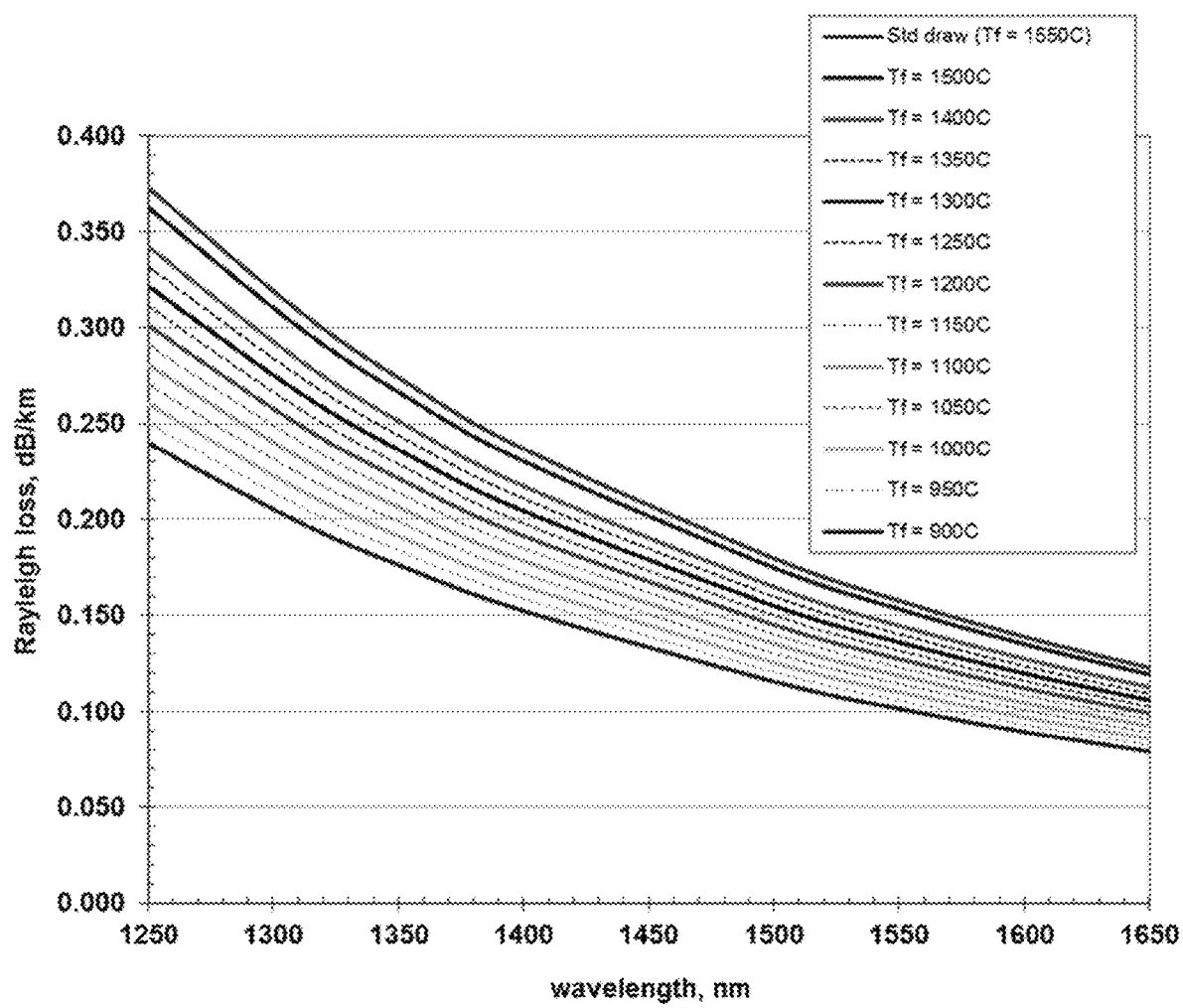
FIG. 14 illustrates the dependence of Rayleigh scattering loss on wavelength for a series of silica fibers that differ in fictive temperature.

FIG. 14 illustrates the modeled effect of fictive temperature ($T_f$) on Rayleigh scattering loss for silica fiber. Rayleigh scattering is the primary contribution to attenuation over the wavelength range indicated. The plot shows the Rayleigh scattering loss as a function of wavelength for silica fibers having fictive temperatures that range from 900° C. to 1550° C. The uppermost trace shows Rayleigh scattering loss for a fiber prepared in a standard air-cooled draw process without inclusion of a slow cooling device. Fibers prepared by the standard air-cooled draw process have a fictive temperature of ~1550° C. The remaining traces are ordered in descending order of fictive temperature, where fictive temperature decreases as indicated in the legend. The lowermost trace corresponds to a fiber having a fictive temperature of 900° C. The traces demonstrate a decrease in Rayleigh scattering loss as the fictive temperature of the fiber decreases. The lowest attenuation was observed in the fiber having a fictive temperature of 900° C. and the highest attenuation was observed in the fiber having a fictive temperature of 1550° C. Intermediate levels of attenuation were observed for fibers having fictive temperatures between 900° C. and 1550° C. Attenuation was observed to consistently decrease throughout the indicated wavelength range as the fictive temperature of the fiber decreased.

As noted hereinabove, fiber fictive temperature can be decreased by increasing the period of time at which the fiber temperature is above a temperature conducive to relaxation of glass structure during cooling. Such temperatures include temperatures in the glass transition region of the fiber (e.g. temperatures in the range from ~100° C. below the glass transition temperature to temperatures above the glass transition temperature and below the melting temperature of the fiber). Fiber processing system configuration that incorporate reheating stages permit passes of the fiber through multiple slow cooling devices and thus prolong the time period over which the fiber is exposed to process temperatures sufficiently high to reduce fictive temperature during cooling. The fictive temperature of the fiber can be reduced with each pass of the fiber through a slow cooling device and the total reduction in fictive temperature can be controlled through the number of slow cooling devices incorporated in the process pathway. As noted hereinabove, the fiber temperature decreases rapidly upon exit from a slow cooling device. By including reheating stages between slow cooling devices in the process pathway, the temperature of the fiber can be raised above the temperature needed to reduce the fictive temperature and delivered to a slow cooling device where the time period over which such temperature can be maintained is accordingly prolonged.

The fictive temperature of silica fibers prepared in accordance with the present description may be less than 1450° C., or less than 1400° C., or less than 1350° C., or less than 1300° C., or less than 1250° C., or less than 1200° C., or less than 1150° C., or less than 1100° C.

The attenuation of silica fibers prepared in accordance with the present description at 1550 nm may be less than 0.18 dB/km, or less than 0.17 dB/km, or less than 0.16 dB/km, or less than 0.15 dB/km, or less than 0.14 dB/km, or less than 0.13 dB/km, or less than 0.12 dB/km.

In one embodiment, the fiber has a fictive temperature less than 1450° C. and an attenuation at 1550 nm less than 0.18 dB/km. In one embodiment, the fiber has a fictive temperature less than 1400° C. and an attenuation at 1550 nm less than 0.17 dB/km. In one embodiment, the fiber has a fictive temperature less than 1350° C. and an attenuation at 1550 nm less than 0.16 dB/km. In one embodiment, the fiber has a fictive temperature less than 1300° C. and an attenuation at 1550 nm less than 0.15 dB/km. In one embodiment, the fiber has a fictive temperature less than 1250° C. and an attenuation at 1550 nm less than 0.14 dB/km. In one embodiment, the fiber has a fictive temperature less than 1250° C. and an attenuation at 1550 nm less than 0.13 dB/km. In one embodiment, the fiber has a fictive temperature less than 1250° C. and an attenuation at 1550 nm less than 0.12 dB/km. In one embodiment, the fiber has a fictive temperature less than 1250° C. and an attenuation at 1550 nm less than 0.12 dB/km. In one embodiment, the fiber has a fictive temperature less than 1250° C. and an attenuation at 1550 nm less than 0.10 dB/km.

Figure 15:
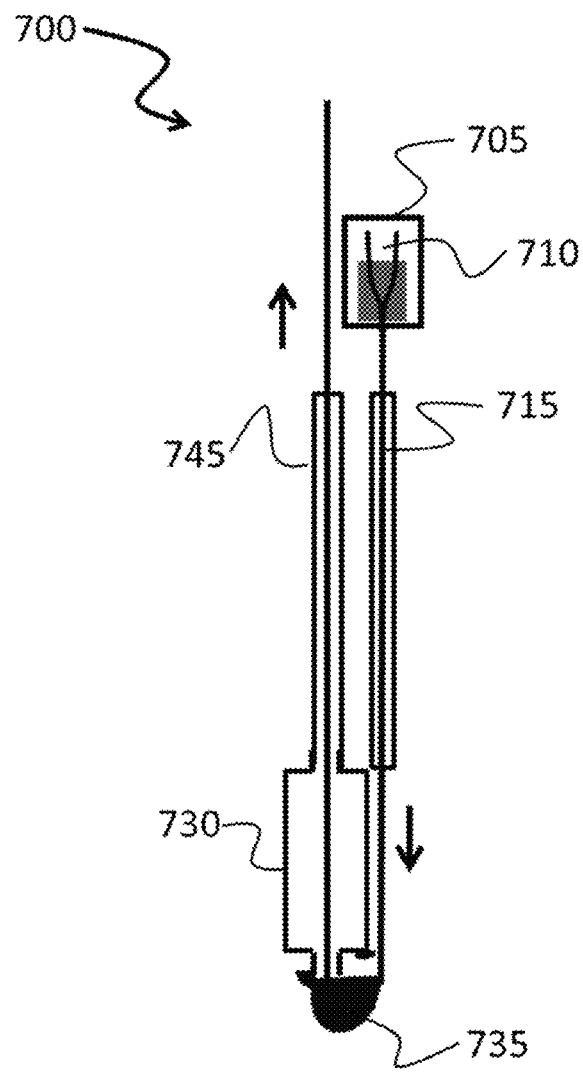
FIG. 15 depicts an exemplary fiber processing system that includes a draw furnace, a fiber-turning device, a reheating stage, and two slow cooling devices.

The exemplary system shown in FIG. 15 is provided to illustrate the benefit of including a second slow cooling device to a fiber processing system relative to a system having a single slow cooling device. FIG. 15 shows a fiber processing system 700, which illustrates a process pathway that includes, the downstream direction, draw furnace 705, preform 710, slow cooling device 715, fiber-turning device 735, reheating stage 730, and slow cooling device 745. Slow cooling devices 715 and 745 are of the type described hereinabove in connection with FIG. 13. Slow cooling device 715 was maintained at a uniform temperature of 1100° C. Upon exiting slow cooling device 715, the fiber is conveyed to fiber-turning device 735 and delivered to reheating stage 730. The fiber is heated to the uniform temperature maintained in slow cooling device 745 in reheating stage 730 and then conveyed to slow cooling device 745. Various temperatures for slow cooling device 745 were considered and the effect of the selected uniform temperature on the fictive temperature and attenuation of the fiber were determined.

Table 1 summarizes relevant operating and performance parameters modeled for the system shown in FIG. 15 for silica fibers. The notation "Ex." signifies an exemplary trial. "SCD" refers to slow cooling device and $T_f$ refers to fictive temperature. "First fiber turning device" refers to fiber-turning device 735 and "second SCD" refers to slow cooling device 745. Table 1 lists the draw speed, temperature of the fiber at the entrance to fiber-turning device 735, fictive temperature of the fiber at the entrance to fiber-turning device 735, the uniform temperature of slow cooling device 745, the residence time of the fiber in slow cooling device 745, the fictive temperature of the fiber at the point of emergence from slow cooling device 745, the decrease in fictive temperature of the fiber provided by slow cooling device 745, and the reduction in attenuation at 1550 nm resulting from the reduction in fictive temperature provided by slow cooling device 745. Reheating stage 730 heated the fiber up to the uniform temperature of slow cooling device 745 and the fiber entered slow cooling device 745 at the uniform temperature of slow cooling device 745. Inclusion of a second slow cooling device in the fiber process pathway led to a significant reduction in the fictive temperature of the fiber and a significant reduction in attenuation at 1550 nm.

pathway shown in FIG. 8). The results shown in Table 2 illustrate that further reductions in fictive temperature and attenuation of the fiber are achievable when additional reheating stages and slow cooling devices are included in the

TABLE 1

| Parameter | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| Draw Speed (m/s) | 50 | 50 | 50 | 42 | 42 | 42 | 35 | 35 | 35 |
| Fiber Temperature entering first fiber-turning device (° C.) | 959 | 959 | 959 | 890 | 890 | 890 | 828 | 828 | 828 |
| $T_f$ of fiber at first fiber-turning device (° C.) | 1482 | 1482 | 1482 | 1477 | 1477 | 1477 | 1479 | 1479 | 1479 |
| Temp of second SCD (° C.) | 1200 | 1250 | 1300 | 1200 | 1250 | 1300 | 1200 | 1250 | 1300 |
| Additional Residence time in second SCD (sec) | 0.16 | 0.16 | 0.16 | 0.19 | 0.19 | 0.19 | 0.23 | 0.23 | 0.23 |
| $T_f$ in final fiber (° C.) | 1468 | 1461 | 1453 | 1462 | 1454 | 1446 | 1461 | 1452 | 1442 |
| Reduction in $T_f$ of fiber beyond the first air-turn device (° C.) | 14 | 21 | 29 | 15 | 23 | 31 | 18 | 27 | 37 |
| Attenuation reduction at 1550 nm due to residence time in second SCD (dB/km) | 0.0013 | 0.0019 | 0.0026 | 0.0014 | 0.0021 | 0.0028 | 0.0016 | 0.0024 | 0.0033 |

The fiber temperature at the point of entry to fiber-turning device 735 in the exemplary embodiments presented in Table 1 is in the range from 800° C.-1000° C. In other embodiments, the fiber temperature at the point of entry to fiber-turning device 735 is in the range from 1000° C.-1100° C., or in the range from 950° C.-1100° C., or in the range from 1000° C.-1150° C., or in the range from 950° C.-1150° C. The fiber temperature at the point of entry to fiber-turning device 735 may be controlled by varying the length and/or temperature of slow cooling device 715 or by controlling the spacing between the exit of slow cooling device 715 and the entrance of fiber-turning device 735.

process pathway. Continued reductions in fictive temperature and attenuation are expected as the number of slow cooling devices and reheating stages included in the process pathway is increased. Separation of the process pathway segments by fiber-turning devices enables construction of fiber process pathways with a large number of reheating stages and slow cooling devices without the need to increase the vertical headspace of the manufacturing facility to impractical levels.

TABLE 2

| Parameter | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|
| Draw Speed (m/s) | 50 | 50 | 50 | 42 | 42 | 42 | 35 | 35 | 35 |
| Fiber Temperature entering first fiber-turning device (° C.) | 959 | 959 | 959 | 890 | 890 | 890 | 828 | 828 | 828 |
| $T_f$ of fiber at first fiber-turning device (° C.) | 1482 | 1482 | 1482 | 1477 | 1477 | 1477 | 1479 | 1479 | 1479 |
| Temp of additional SCDs (° C.) | 1200 | 1250 | 1300 | 1200 | 1250 | 1300 | 1200 | 1250 | 1300 |
| Additional Residence time in additional SCDs (sec) | 0.48 | 0.48 | 0.48 | 0.57 | 0.57 | 0.57 | 0.69 | 0.69 | 0.69 |
| $T_f$ in final fiber (° C.) | 1448 | 1433 | 1420 | 1440 | 1425 | 1412 | 1436 | 1419 | 1406 |
| Reduction in $T_f$ of fiber beyond the first air-turn device (° C.) | 34 | 49 | 62 | 37 | 52 | 65 | 43 | 60 | 73 |
| Attenuation reduction at 1550 nm due to residence time in additional SCDs (dB/km) | 0.0031 | 0.0044 | 0.0056 | 0.0033 | 0.0047 | 0.0059 | 0.0039 | 0.0054 | 0.0066 |

Table 2 presents modeled results for extensions of the system shown in FIG. 15 to include multiple slow cooling devices. Two additional process pathway segments were added to the system shown in FIG. 15. Each of the two additional process pathway segments included a reheating stage and slow cooling device (analogous to reheating stage 730 and slow cooling device 745 shown in FIG. 15 with placement of the slow cooling device downstream from the reheating stage as shown in FIG. 15). The different process pathway segments were separated by a fiber-turning device (analogous to fiber-turning device 735 shown in FIG. 15) to provide a folded process pathway (similar to the process Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the illustrated embodiments. Since modifications, combinations, sub-combinations and variations of the disclosed embodiments that incorporate the spirit and substance of the illustrated embodiments may occur to persons skilled in the art, the description should be construed to include everything within the scope of the appended claims and their equivalents.

What is claimed is:

1. A method of processing an optical fiber comprising:
drawing an optical fiber from a preform;
conveying said optical fiber along a process pathway;
heating said optical fiber from a first temperature to a second temperature along said process pathway, said first temperature less than 1300° C. and said second temperature between 600° C. and 1500° C.; and
cooling said optical fiber from said second temperature to a third temperature along said process pathway, said cooling including exposing said optical fiber to a process temperature in the range from 1000° C. to 1700° C. for longer than 0.2 sec.

2. The method of claim 1, wherein said first temperature is less than 1000° C.

3. The method of claim 2, wherein said second temperature is greater than 1100° C.

4. The method of claim 2, wherein said third temperature is less than 1000° C.

5. The method of claim 1, wherein said first temperature is less than 1000° C. and said second temperature is greater than 1000° C.

6. The method of claim 1, wherein said second temperature is greater than 1300° C.

7. The method of claim 1, wherein said cooling includes exposing said optical fiber to a process temperature in the range from 1000° C. to 1700° C. for longer than 1.0 sec.

8. The method of claim 1, wherein said cooling includes exposing said optical fiber to a process temperature in the range from 1000° C. to 1300° C. for longer than 0.2 sec.

9. The method of claim 1, wherein said cooling includes exposing said optical fiber to a process temperature in the range from 1000° C. to 1300° C. for longer than 1.0 sec.

10. The method of claim 1, wherein said cooling includes exposing said optical fiber to a process temperature in the range from 1000° C. to 1300° C. for longer than 2.0 sec.

11. The method of claim 1, wherein said second temperature is at least 100° C. higher than said first temperature.

12. The method of claim 1, wherein said second temperature is at least 50° C. higher than said first temperature.

13. The method of claim 1, wherein said second temperature is at least 200° C. higher than said first temperature.

14. The method of claim 1, wherein said cooling includes passing said optical fiber through a furnace, said furnace including two or more zones, said zones differing in temperature.

15. The method of claim 1, further comprising redirecting said optical fiber from a first process pathway segment to a second process pathway segment.

16. The method of claim 1, wherein said optical fiber is conveyed at a speed greater than 20 m/s along said process pathway.

17. The method of claim 1, wherein said optical fiber is conveyed at a speed greater than 40 m/s along said process pathway.

18. The method of claim 1, wherein said optical fiber is conveyed at a speed greater than 50 m/s along said process pathway.

* * * * *